United States Patent
Atsumi et al.

(10) Patent No.: US 6,356,666 B1
(45) Date of Patent: Mar. 12, 2002

(54) IMAGE COMPRESSING/EXPANDING METHOD AND IMAGE COMPRESSION EXPANDING DEVICE

(75) Inventors: Eiji Atsumi; Masayuki Yoshida, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/242,538

(22) PCT Filed: Jul. 30, 1997

(86) PCT No.: PCT/JP97/02655

§ 371 Date: Feb. 18, 1999

§ 102(e) Date: Feb. 18, 1999

(87) PCT Pub. No.: WO99/07155

PCT Pub. Date: Feb. 11, 1999

(51) Int. Cl.[7] ................................................. G06K 9/36
(52) U.S. Cl. ........................ 382/240; 382/232; 382/239
(58) Field of Search ................................ 382/232, 240, 382/239; 375/240.11, 240.1; 348/699

(56) References Cited

U.S. PATENT DOCUMENTS

| | | | | |
|---|---|---|---|---|
| 5,748,786 A | * | 5/1998 | Zandi et al. | 382/240 |
| 5,819,215 A | * | 10/1998 | Dobson et al. | 704/230 |
| 6,011,499 A | * | 1/2000 | Agarwal et al. | 341/67 |
| 6,144,771 A | * | 11/2000 | Li et al. | 382/239 |

FOREIGN PATENT DOCUMENTS

| | | | | |
|---|---|---|---|---|
| JP | 8116265 | 5/1996 | | H03M/7/40 |
| JP | 8322050 | 12/1996 | | H04N/7/32 |
| JP | 9027752 | 1/1997 | | H03M/7/30 |

OTHER PUBLICATIONS

Jafarkhani et al., "Fast Reconstruction of Subband Decomposed Signals for Progressive Transmission", IEEE, Proceedings, Data Compression Conference, pp. 230–239, 1996.*

* cited by examiner

Primary Examiner—Jose L. Couso
Assistant Examiner—Anh Hong Do

(57) ABSTRACT

On the image compression side, each lossless wavelet transformation coefficient on which a lossless wavelet transformation for an image is effected, is first subjected to quantization and entropy coding in a coarse step size. Thereafter, quantization error signals are successively subjected to quantization and entropy coding in a fine step size to thereby generate a progressive coded bit stream. On the image expansion side, lossless wavelet transformation coefficients obtained by entropy decoding and inverse quantization are subjected to inverse lossless wavelet transformations every coded bit streams bearing respective stages for image progressive reconstruction display. Data obtained by the inverse transformations is added to the already-reconstructed image data together with updated auxiliary information about each image to thereby reconstruct and display the image progressively. Now, the updated auxiliary information necessary to update the image is generated from some of information about lossless wavelet transformation coefficients necessary to update the image quality by one stage and some of lossless wavelet transformation coefficients necessary to generate the already-displayed image, whereby it is not necessary to hold all the information about lossless wavelet transformation coefficients necessary to generate a pre-updating image and memory's capacity can be reduced.

21 Claims, 11 Drawing Sheets

UPDATED AUXILIARY INFORMATION β GENERATION TABLE

|  |  | (VALUES OF TWO RIGHTMOST BITS OF Δfk) mod4 | | | |
| --- | --- | --- | --- | --- | --- |
|  |  | 0 | 1 | 2 | 3 |
| (VALUES OF TWO RIGHTMOST BITS OF fk) mod4 | 0 | 0 | 0 | 0 | 0 |
|  | 1 | 0 | +1 | 0 | 0 |
|  | 2 | 0 | 0 | −1 | −1 |
|  | 3 | 0 | 0 | −1 | 0 |

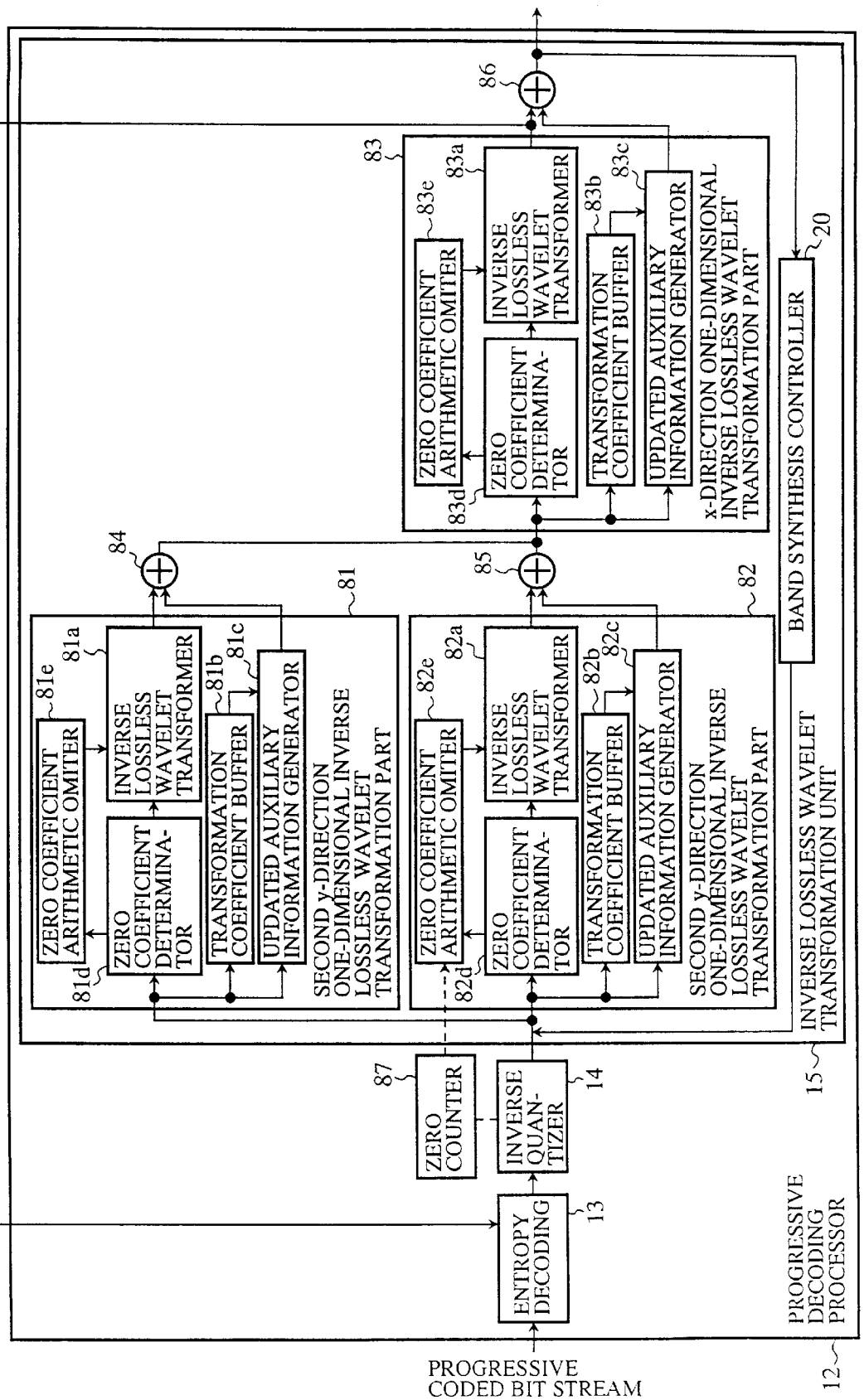

IMAGE COMPRESSING/EXPANDING METHOD AND IMAGE COMPRESSION EXPANDING DEVICE

This application is the national phase under 35 U.S.C. §371 of prior PCT International Application No. PCT/JP97/02655 which has an International filing date of Jul. 30, 1997 which designated the United States of America.

TECHNICAL FIELD

This invention relates to a method of and a device for performing image compression (image coding) and image expansion (image decoding), which are based on lossless wavelet transformations on which attention is focused as a platform of the next-generation image coding system capable of implementing a unified form of lossless coding/lossy coding.

BACKGROUND ART

In an image compressing/expanding device constructed based on conventional linear transformations such as a wavelet transformation, DCT, etc., the implementation of the function of progressively reproducing and displaying image data by fewer numbers of execution memories and fewer numbers of arithmetic operations takes advantage of the fact that an inverse wavelet transformation, a DCT inverse transformation or the like is a linear transformation (linear system). Further, since the arithmetic order of operations necessary for the inverse transformation and addition made upon updating information in a transformation coefficient domain is changeable, the order of these is changed, an inverse transformation is effected only on transformation coefficient information necessary for information updating and the so-obtained result is added to the immediately-preceding reconstructed image data in an image domain, whereby the progressive reconstruction display of the image has been realized.

FIG. 1 is a block diagram of an image expanding device which executes a processing order obtained from the changing of the arithmetic order created based on the contents described in, for example, IEEE Data Compression Conference (DCC-96), April 1996 "Fast Reconstruction of Subband Decomposed Signals for Progressive Transmission". In the drawing, pre-updating transformation coefficient information b0 is inversely transformed by an inverse transformer 101 and updated information $\Delta$b0 is inversely transformed by an inverse transformer 102. Thereafter, the outputs of both inverse transformers are added together by a transformation coefficient information updater 103 to thereby obtain a reconstructed image (b0+$\Delta$b0) 104.

In the progressive reconstruction display of the image by the image compressing/expanding device based on the conventional linear transformations as described above, the inverse transformation is effected only on the transformation coefficient information necessary for information updating by using the linearity of the transformation. The so-obtained result is added to the immediately preceding reconstructed image. Thus, the progressive reconstruction display of the image can be implemented without additionally holding information about transformation coefficients used to reconstruct the immediately preceding reconstructed image. As a result, execution memories could be reduced in number.

Further, the speeding up of processing can be implemented by utilizing a property of the coefficients whose values are zero, increase the number and omitting inverse transformation arithmetic operations on these coefficients when data is reconstructed only from the transformation coefficients necessary for updating.

However, an image compressing/expanding device based on conventional linear transformations has the problem in that a high picture-quality reconstructed image having the image quality of strictly the same level as the original image cannot be obtained due to a quantization error or the like.

While the image compressing/expanding device based on the lossless wavelet transformation can obtain the high picture-quality reconstructed image, the inverse lossless wavelet transformation used as the platform of the image expanding device includes a non-linear arithmetic operation. Therefore, the progressive reconstruction display of the image must be inevitably implemented by updating information in a wavelet transformation coefficient domain and thereafter performing an inverse lossless wavelet transformation on it in order to implement the progressive reconstruction display of the image. Thus, the lossless wavelet transformation coefficients used to generate the pre-updating image, i.e., all the information immediately before the execution of the inverse lossless wavelet transformation must be held to update the displayed image. Therefore, a problem arises in that the size of the execution memory is reduced and a high-speed image progressive reconstruction display cannot be implemented.

Further, a problem arises in that since the number of transformation coefficients zero in value relatively increases if an inverse lossless wavelet transformation is effected on wavelet transformation coefficients comprised of only information necessary for updating, it is quite natural that the number of arithmetic operations at the inverse lossless wavelet transformation can be reduced and the processing can be speeded up by using its relative increase, but the number of the transformation coefficients zero in value relatively decreases because the inverse lossless wavelet transformation is made after the updating of information in a transformation coefficient domain. Thus the speeding up of the processing utilizing the property that many coefficients zero in value are included in the wavelet transformation coefficients indicative of the information necessary for updating cannot be expected. Namely, the image compressing/expanding device based on the linear transformation and the image compressing/expanding device based on the lossless wavelet transformation have both merits and demerits respectively.

With the foregoing problems in view, it is therefore an object of the present invention to provide an image compressing/expanding device based on a lossless wavelet transformation/inverse transformation, which is capable of implementing a progressive reconstruction display of an image while limiting or controlling the consumption of execution memories, thereby obtaining a high picture-quality reconstructed image.

DISCLOSURE OF THE INVENTION

An image compressing/expanding method according to the invention as claimed in claim 1 comprises, on the image compression side, performing quantization and entropy coding on a lossless wavelet transformation coefficient subjected to a lossless wavelet transformation, and on the image expansion side, adding pre-quantization data generated when an inverse lossless wavelet transformation is effected on a lossless wavelet transformation coefficient subjected to entropy decoding and inverse quantization to thereby generate an image, to the next updated data subjected to entropy decoding and inverse quantization, and thereafter performing the inverse lossless wavelet transformation on the result of addition.

Owing to such a construction, the image compressing/expanding method based on the lossless wavelet transformation brings about an effect in that a progressive representation can be implemented and a high picture-quality reconstructed image having image quality of strictly the same level as the original image can be obtained.

An image compressing/expanding method according to the invention as claimed in claim 2 comprises, on the image compression side, performing quantization and entropy coding on each lossless wavelet transformation coefficient subjected a lossless wavelet transformation, and on the image expansion side, effecting an inverse lossless wavelet transformation on each lossless wavelet transformation coefficient subjected to entropy decoding and inverse quantization to thereby generate an image, and generating updated auxiliary information necessary upon updating an image by adding the image generated by the inverse lossless wavelet transformation to the already generated image, from information necessary upon updating the quality of the image by one stage and some of information about each transformation coefficient immediately before the execution of the inverse lossless wavelet transformation.

Owing to such a construction, an effect is brought about in that upon implementation of a progressive reconstruction display, it is unnecessary to hold all the transformation coefficient information used to generate a pre-updating image and an execution memory can be reduced in size.

An image compressing/expanding device according to the invention as claimed in claim 3 comprises an image compressing device including a lossless wavelet transformation unit for subjecting a digital image to a lossless wavelet transformation, and a progressive coding generation unit for subjecting lossless wavelet transformation coefficients obtained as a result of lossless wavelet transformations to quantization and entropy coding to thereby generate a coded bit stream added to an already generated coded bit stream and simultaneously generating a progressive coded bit stream while repeating this operation until the value of a quantization error reaches zero, and an inverse lossless wavelet transformation unit for effecting an inverse lossless wavelet transformation on each lossless wavelet transformation coefficient subjected to entropy decoding and inverse quantization with each of N types of data necessary to update data of the progressive coded bit stream by N stages as one processing unit, thereby generating an image, a transformation coefficient buffer for holding some of pre-quantization transformation coefficient data generated upon the generation of the image, and a transformation coefficient information updater for adding updated auxiliary information generated from data obtained by subjecting transformation coefficient data obtained by effecting entropy decoding and inverse quantization on the next processing unit bearing information for updating the image on an inverse lossless wavelet transformation with the inverse lossless wavelet transformation unit, some of the same inversely-transformed data and the data held in the transformation coefficient buffer, to the immediately preceding reconstructed/displayed image in an image domain, thereby to update image information.

Owing to such a construction, the image compressing/expanding method based on the lossless wavelet transformation allows a progressive representation to be implemented and a high picture-quality reconstructed image having image quality of strictly the same level as the original image can be obtained.

An image compressing/expanding device according to the invention as claimed in claim 4 comprises an image compressing device including a lossless wavelet transformation unit for subjecting a digital image to a lossless wavelet transformation, and a progressive coding generation unit for subjecting lossless wavelet transformation coefficients obtained as a result of lossless wavelet transformations to quantization and entropy coding to thereby generate a coded bit stream added to an already generated coded bit stream and simultaneously generating a progressive coded bit stream while repeating this operation until the value of a quantization error reaches zero, and an image expanding device including an inverse lossless wavelet transformation unit for effecting an inverse lossless wavelet transformation on each lossless wavelet transformation coefficient subjected to entropy decoding and inverse quantization with each of N types of data necessary to update data of the progressive coded bit stream by N stages as one processing unit, thereby generating an image, a transformation coefficient buffer for holding information necessary upon updating the quality of the image by a further stage, of the lossless wavelet transformation coefficients, and an updated auxiliary information generator for generating updated auxiliary information additionally necessary upon updating the image by adding the image generated by the inverse lossless wavelet transformation to the already-reconstructed image from the information stored in the transformation coefficient buffer and information about each transformation coefficient immediately before the execution of the inverse lossless wavelet transformation.

Owing to such a construction, an effect is brought about in that upon implementation of a progressive reconstruction display, it is unnecessary to hold all the transformation coefficient information used to generate a pre-updating image and an execution memory can be reduced in size.

An image compressing/expanding device according to the invention as claimed in claim 5 comprises an image compressing device having at least one S transformation part for implementing a lossless wavelet transformation by an S transformation, and an image expanding device having at least one Inverse S transformation part for implementing an inverse lossless wavelet transformation by an inverse S transformation, and wherein the updated auxiliary information is generated only from LSB of respective lossless wavelet S transformation coefficients necessary to generate a pre-updating image through a lossless wavelet inverse S transformation and LSB of lossless wavelet S transformation coefficients bearing only information necessary for updating.

Owing to such a construction, an effect is brought about in that the amount of information about transformation coefficients held to generate updated auxiliary information necessary to implement a progressive reconstruction display can be limited to one bit for each transformation coefficient and the size of an execution memory can be reduced.

An image compressing/expanding device according to the invention as claimed in claim 6 comprises an image compressing device having at least one TS transformation part for implementing a lossless wavelet transformation by a TS transformation, and an image expanding device having at least one inverse TS transformation part (constructed by an S transformation and a linear transformation and a non-linear transformation placed in its previous stage) for implementing an inverse lossless wavelet transformation by an inverse TS transformation, and wherein the generation of updated auxiliary information under a progressive reproducing process through an inverse transformation set in a stage preceding an inverse S transformation is performed as a first stage based only on the two rightmost bits of respective transformation coefficients necessary to generate pre-updating data through the same inverse transformation and the two rightmost bits of respective transformation coefficients bearing only information newly necessary for updating, and as a second stage, the so-obtained updated information is progressively reconstructed through the inverse S transformation as an input, whereby the progressive reconstruction display of an image at the image expanding device is performed in accordance with the two-stage processing through the inverse S transformation.

Owing to such a construction, an effect is brought about in that as compared with the case where the S transformation and Inverse S transformation are used, a higher picture-quality reconstructed image can be obtained if compared at the same bit rate.

An image compressing/expanding device according to the invention as claimed in claim 7, is constructed in such a manner that the image compressing device or the image expanding device is provided with an S transformation/TS transformation selector for repeatedly applying band division to the lowest frequency components generated by the lossless wavelet transformation every x and y directions so as to divide into a desired number of bands and selecting the corresponding lossless wavelet transformation so as to selectively use the S and TS transformations according to the respective directions and respective repetitions without always having to use a single transformation.

Owing to such a construction, an effect is brought about in that as compared with the case in which the S transformation and Inverse S transformation are used, a higher picture-quality reconstructed image can be obtained if compared at the same bit rate, and the size of an execution memory can be reduced as compared with the case in which a TS transformation and an inverse TS transformation are used as all the transformations and inverse transformations.

An image compressing/expanding device according to the invention as claimed in claim 8 comprises
an image compressing device including a lossless wavelet transformation unit for subjecting a digital image to a lossless wavelet transformation, and a progressive coding generation unit for subjecting lossless wavelet transformation coefficients obtained as a result of lossless wavelet transformations to quantization and entropy coding to thereby generate a coded bit stream added to an already generated coded bit stream and simultaneously generating a progressive coded bit stream while repeating this operation until the value of a quantization error reaches zero, and
an image expanding device including an inverse lossless wavelet transformation unit for effecting an inverse lossless wavelet transformation on each lossless wavelet transformation coefficient subjected to entropy decoding and inverse quantization with each of N types of data necessary to update data of the progressive coded bit stream by N stages as one processing unit, thereby generating an image, a transformation coefficient buffer for holding information necessary upon updating the quality of the image by a further stage, of the lossless wavelet transformation coefficients, an updated auxiliary information generator for generating updated auxiliary information additionally necessary upon updating the image by adding the image generated by the inverse lossless wavelet transformation to the already-reconstructed image from the information stored in the transformation coefficient buffer and information about each transformation coefficient immediately before the execution of the inverse lossless wavelet transformation, a zero coefficient determinator for determining, immediately before the execution of the inverse lossless wavelet transformation, whether the values of the respective transformation coefficients are zero, and a zero coefficient arithmetic omitter for omitting a sum-of-products arithmetic operation for an inverse lossless wavelet transformation effected on the transformation coefficients whose values are zero.

Owing to such a construction, an effect is brought about in that a progressive reconstruction display process can be speeded up.

An image compressing/expanding device according to the invention as claimed in claim 9 is constructed such that the image expanding device is provided with a zero number counter for counting the number (zero number) of continuously-generated values zero of the transformation coefficients and outputting a signal used to omit the sum-of-products arithmetic operation for the inverse lossless wavelet transformation when the number thereof reaches a predetermined counted value.

Owing to such a construction, an effect is brought about in that a progressive reconstruction display process can be further speeded up.

An image compressing/expanding device according to the invention as claimed in claim 10 is constructed such that the image compressing/expanding device as claimed in any of claims 3 to 9 is applied to an image decoding process of a facsimile.

Owing to this construction, an effect is brought about in that upon the image decoding process of the facsimile, the consumption of execution memories can be reduced and a high picture-quality image can be obtained.

An image compressing/expanding device according to the invention as claimed in claim 11 is constructed such that the image compressing/expanding device as claimed in any of claims 3 to 9 is applied to an image decoding process of a portable information terminal.

Owing to this construction, an effect is brought about in that upon the image decoding process of the portable terminal, the consumption of execution memories can be reduced and a high picture-quality image can be obtained.

An image compressing/expanding device according to the invention as claimed in claim 12 is construction such that the image compressing/expanding device as claimed in any of claims 3 to 9 is applied to an image decoding process of a high image-quality display unit.

Owing to this construction, an effect is brought about in that upon the image decoding process of the high image-quality display unit, the consumption of execution memories can be reduced and a high picture-quality image can be obtained.

An image compressing/expanding device according to the invention as claimed in claim 13 is constructed such that the image compressing/expanding device as claimed in any of claims 3 to 9 is applied to an image decoding process of a printer.

Owing to this construction, an effect is brought about in that upon the image decoding process of the printer, the consumption of execution memories can be reduced and a high picture-quality image can be obtained.

BRIEF DESCRIPTION OF THE DRAWINGS

FIG. 12 is a block diagram depicting a configuration of an image expanding device according to an embodiment 6 of the present invention.

BEST MODE FOR CARRYING OUT THE INVENTION

Best modes for carrying out the invention will hereinafter be explained in accordance with the accompanying drawings to describe this invention in more details.
Embodiment 1

Figure 2:
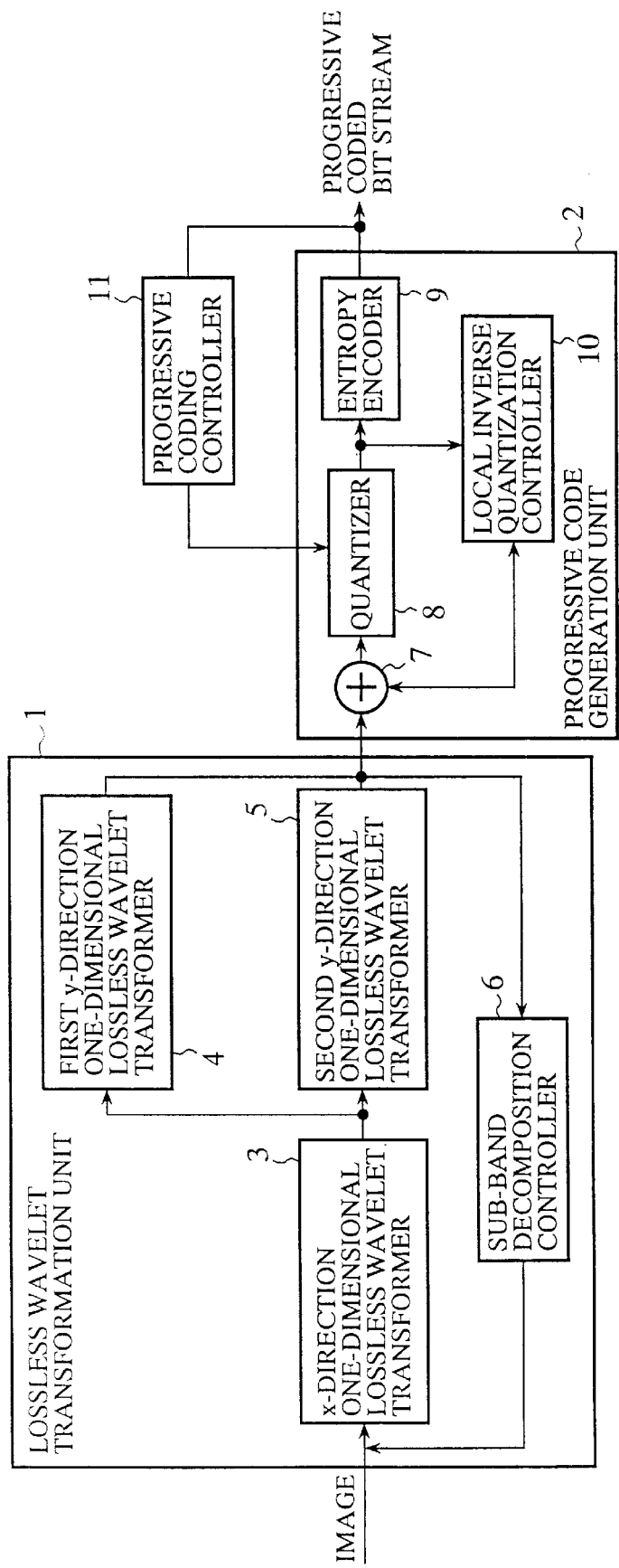
FIG. 2 is a block diagram illustrating a configuration of an image compressing device according to an embodiment 1 of the present invention.

FIG. 2 is a block diagram showing a configuration of an image compressing device according to an embodiment 1 of the present invention. In the drawing, reference numeral 1 indicates a lossless wavelet transformation or transformation unit, and reference numeral 2 indicates a progressive code generation unit. The lossless wavelet transformation unit 1 comprises an x-direction one-dimensional lossless wavelet transformer 3, a first y-direction one-dimensional lossless wavelet transformer 4 associated with a y direction of a low-frequency component converted and generated by the x-direction one-dimensional lossless wavelet transformer, a second y-direction one-dimensional lossless wavelet transformer 5 associated with the y direction of the low-frequency component converted and reconstructed by the x-direction one-dimensional lossless wavelet transformer in the same manner as described above, and a sub-band decomposition controller 6. Further, the progressive code generation unit 2 comprises a subtracter 7, a quantizer 8, an entropy encoder 9 and a local inverse quantization controller 10. Reference numeral 11 indicates a progressive coding controller for inputting the output of the entropy encoder 9 therein and controlling the quantizer 8.

Figure 3:
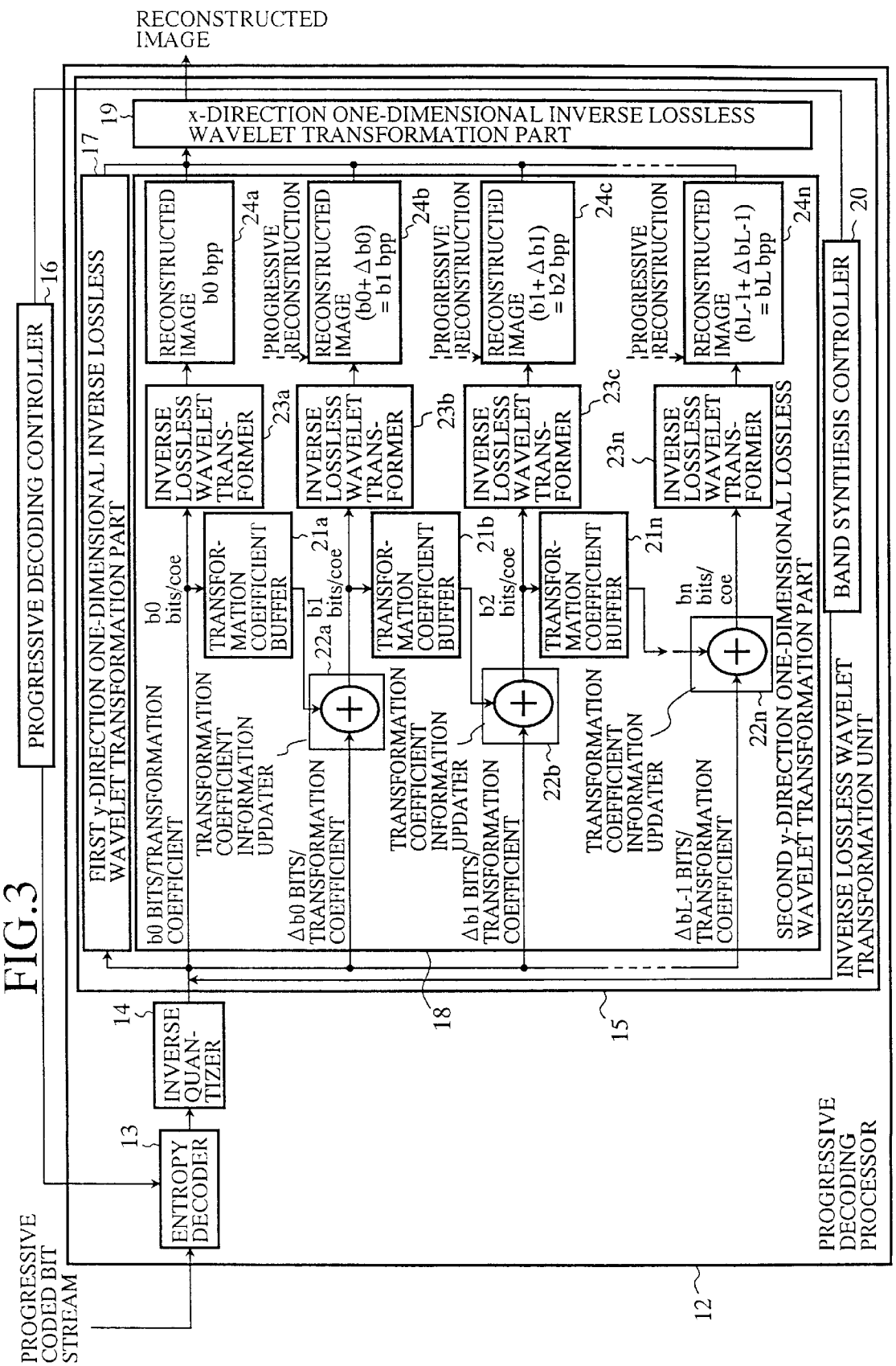
FIG. 3 is a block diagram depicting a configuration of an image expanding device according to an embodiment 1 of the present invention.

FIG. 3 is a block diagram illustrating a configuration of an image expanding device according to an embodiment 1 of the present invention. In the drawing, reference numeral 12 indicates a progressive decoding processor. The progressive decoding processor 12 has an entropy decoder 13, an inverse quantizer 14, and an inverse lossless wavelet transformation unit 15. Reference numeral 16 indicates a progressive coding controller for controlling the entropy decoder 13.

The inverse lossless wavelet transformation unit 15 comprises a first y-direction one-dimensional inverse lossless wavelet transformation part 17, a second y-direction one-dimensional inverse lossless wavelet transformation part 18, an x-direction one-dimensional inverse lossless wavelet transformation part 19 and a band synthesis controller 20.

Since the first and second y-direction one-dimensional inverse lossless wavelet transformation parts 17 and 18 and the x-direction one-dimensional inverse lossless wavelet transformation part 19 are identical to each other in internal configuration, the configuration of the second y-direction one-dimensional inverse lossless wavelet transformation part 18 will be explained as one example thereof. In this case, the second y-direction one-dimensional inverse lossless wavelet transformation part 18 includes a plurality of transformation coefficient buffers 21a through 21n, a plurality of transformation coefficient information updaters 22a through 22n, a plurality of inverse lossless wavelet transformers 23a through 23n, and a plurality of reconstructed image sections 24a through 24n.

The operation will next be described.

With respect to an image inputted to the image compressing device, an image frequency band thereof is decomposed into frequency sub-bands by the x-direction one-dimensional lossless wavelet transformer 3, the first y-direction one-dimensional lossless wavelet transformer 4 and the second y-direction one-dimensional lossless wavelet transformer 5. The above-described frequency sub-band decomposition is repeated with respect to the lowest components of the decomposed frequency bands. Their decomposed outputs are successively subjected to a lossless wavelet transformation so that lossless wavelet transformation factors or coefficients made up of integral values alone are produced.

Next, the reconstructed lossless wavelet transformation coefficients are sent to the progressive coded data generation unit 2, where a quantizing process is effected on the transformation coefficients received as inputs from the lossless wavelet transformation unit 1 by the quantizer 8 to generate coarsest progressive coded image data. The generated quantized data is transmitted to the entropy encoder 9 used for Huffman coding, arithmetic coding, etc., where entropy coding is effected thereon to thereby generate a coded bit stream.

In order to additionally encode quantized errors reconstructed in the quantizer 8, i.e., information omitted by quantization subsequently to the above, the subtracter 7 calculates the difference between the quantized errors, i.e., data comprised of the transformation coefficients next previously inputted to the quantizer 8 and data obtained by reverse-quantizing data quantized by the quantizer 8 with the local inverse quantization part 10. Thereafter, the quantizer 8, the entropy encoder 9 and the local inverse quantization part 10 effect quantization, entropy encoding and quantization on the calculated differential data.

The encoded data obtained by the entropy encoding with the entropy encoder 9 is added to the back of encoded data corresponding to the already-obtained same image as data to update the previously-obtained coarsest image.

Further, in order to encode information impaired by the quantization of the so-updated image data, the local inverse quantization controller 10 similarly performs quantization and entropy coding on data about the difference between the data next previously inputted to the quantizer 8 and data obtained by quantizing and inversely-quantizing the input data, i.e., a quantization error signal, and repeatedly performs each time a process for adding the so-updated image data to the back of the already-reconstructed encoded data until the loss of information by quantization is eliminated, i.e., a quantization error reaches zero, or the quantization error signal, i.e., the differential data is encoded as it is without its quantization to discontinue repeat processing.

In the above-described processing block, the progressive coding controller 11 performs processes or control necessary for deciding a quantization step size in the quantizer 8 so as to make a transition from coarseness to fineness, determining whether the quantization error reaches zero, and carrying out image progressive coding such as the encoding of the differential data without its quantization.

In the image expanding device illustrated in the embodiment 1, as shown in FIG. 3, when the progressive coded bit stream is inputted to the entropy decoder 13, the image expanding device first fetches encoded data (bits/ transformation coefficient b0) necessary to reproduce or play back the coarsest image from the progressive coded bit stream, entropy-decodes it with the entropy decoder 13, inverse-quantizes the entropy-decoded data with the inverse quantizer 14 and thereafter performs necessary processing on it with the first y-direction one-dimensional inverse lossless wavelet transformation part 17, the second y-direction one-dimensional inverse lossless wavelet transformation part 18 and the x-direction one-dimensional inverse lossless wavelet transformation part 19 to thereby obtain a reconstructed image.

Since, in this case, the y-direction and x-direction one-dimensional inverse lossless wavelet transformation parts 17 through 19 are identical in operation to each other, the operation of the second y-direction one-dimensional inverse lossless wavelet transformation part 18 will be explained as one example thereof. When coded data necessary to reconstruct the coarsest image subjected to entropy decoding and inverse quantization is first inputted, the inverse lossless wavelet transformer 23a performs an inverse lossless wavelet transformation or transformation on it to thereby generate the coarsest reconstructed image b0 (bit/pel).

At this time, data b0 (bits/transformation coefficient) prior to being subjected to the inverse lossless wavelet transformation, which is generated upon production of the reconstructed image b0 (bit/pel) is held in the transformation coefficient buffer 21a, which in turn prepares for updating, i.e., progressive reconstruction of information to be performed by the transformation coefficient information updater 22a in the near future. Next, data $\Delta$b0 (bits/ transformation coefficient) necessary to update the quality of the coarsest image by one step or stage is fetched from the coded bit stream and then entropy-decoded and inverse-quantized. Thereafter, the transformation coefficient information updater 22a adds the so-processed data to the data b0 (bits/transformation coefficient) previously held in the transformation coefficient buffer 21a for progressive representation (i.e., b0+$\Delta$b0=b1). Afterwards, the inverse lossless wavelet transformer 23b effects the lossless wavelet transformation on the added data to thereby produce a reconstructed image b1 (bit/pel) obtained by improving the quality of the displayed coarsest image by one stage.

Even in this case, the data prior to being subjected to the inverse lossless wavelet transformation is held in the transformation coefficient buffer 21b in order to implement reconstruction/progressive representation of an image whose picture quality is to be improved by another stage in the future. This similar operation is repeated till the transformation coefficient buffer 21n. The above-described operation is similarly effected even on the first y-direction one-dimensional inverse lossless wavelet transformation part 17. The x-direction one-dimensional inverse lossless wavelet transformation part 19 similarly performs this operation on a signal inverse-converted by the first and second y-direction one-dimensional inverse lossless wavelet transformation parts 17 and 18.

According to the embodiment 1 as described above, an effect is brought about in that each lossless wavelet transformation coefficient necessary to produce the image immediately before its updating is held, the value of the same transformation coefficient and the value obtained by entropy-decoding and reverse-quantizing the coded data stream necessary for updating are added together within a transformation coefficient domain, followed by execution of the inverse lossless wavelet transformation, whereby a progressive representation can be realized by the image compressing/expanding device based on the lossless wavelet transformation, thereby making it possible to obtain a high picture-quality reconstructed image which finally results in the same image as the original image.

Embodiment 2

Figure 4:
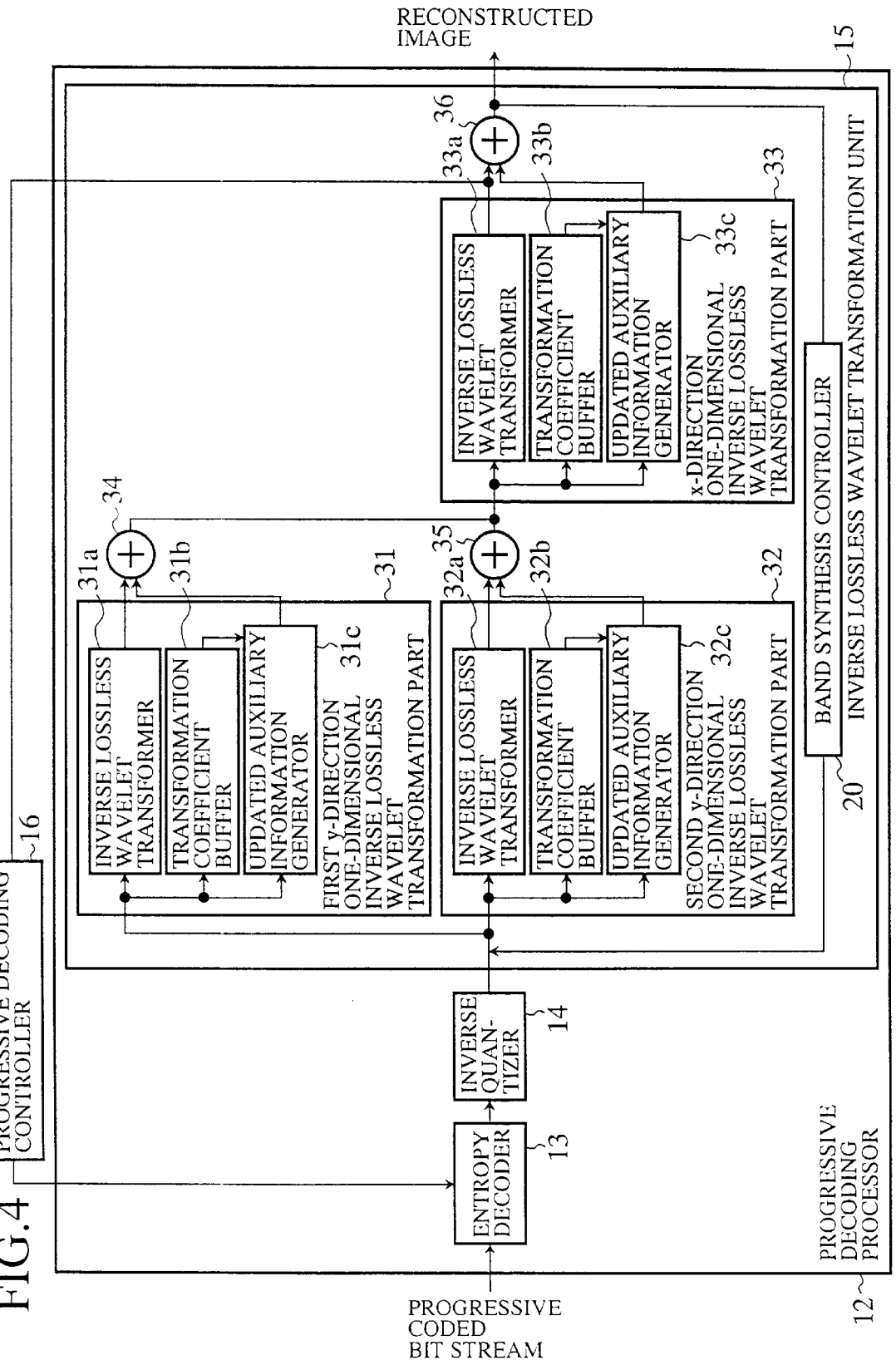
FIG. 4 is a block diagram showing a configuration of an image expanding device according to an embodiment 2 of the present invention.

FIG. 4 is a block diagram showing a configuration of an image expanding device according to an embodiment 2 of the present invention. The same parts as those shown in FIG. 3 are identified by like reference numerals and the description of certain common parts will therefore be omitted. In the drawing, an inverse lossless wavelet transformation unit 15 comprises a first y-direction one-dimensional inverse lossless wavelet transformation part 31, a second y-direction one-dimensional inverse lossless wavelet transformation part 32, an x-direction one-dimensional inverse lossless wavelet transformation part 33, adders 34 through 36 and a band synthesis controller 20.

Since the first and second y-direction one-dimensional inverse lossless wavelet transformation parts 31 and 32 are identical to each other in internal configuration, the configuration of the second y-direction one-dimensional inverse lossless wavelet transformation part 32 will be explained as one example thereof. In this case, the second y-direction one-dimensional inverse lossless wavelet transformation part 32 includes an inverse lossless wavelet transformer 32a, a transformation coefficient buffer 32b, and an updated auxiliary information generator 32c. Further, the x-direction inverse lossless wavelet transformation part 33 has an inverse lossless wavelet transformer 33a, a transformation coefficient buffer 33b, and an updated auxiliary information generator 33c.

The operation will next be described.

In the image compressing device as shown in FIG. 2 in the first place, the x-direction one-dimensional lossless wavelet transformer 3 in the lossless wavelet transformation unit 1 first performs a one-dimensional lossless wavelet transformation on an image in an x direction thereof. Next, the first and second direction one-dimensional lossless wavelet transformers 4 and 5 repeat a process for performing one-dimensional lossless wavelet transformation in a y direction on the resultant converted image by a desired number of times in accordance with the instruction of the sub-band decomposition controller 6 with the same process as one unit, whereby the lossless wavelet transformation or transformation of the image is implemented so that lossless wavelet transformation coefficients are produced.

Next, the reconstructed lossless wavelet transformation coefficients are sent to the progressive coded data generation unit 2, where a quantizing process is first effected on the transformation coefficients received as inputs from the lossless wavelet transformation unit 1 by the quantizer 8 to generate coarsest progressive coded image data. The generated quantized data is transmitted to the entropy encoder 9 used for Huffman coding, arithmetic coding, etc., where entropy coding is effected thereon to thereby generate a coded bit stream.

In order to additionally encode quantized errors reconstructed in the quantizer 8, i.e., information omitted by quantization subsequently to the above, the subtracter 7 calculates the difference between the quantized errors, i.e., data comprised of the transformation coefficients next previously inputted to the quantizer 8 and data obtained by reverse-quantizing data quantized by the quantizer 8 with the local inverse quantization part 10. Thereafter, the quantizer 8 and the entropy encoder 9 effect quantization and entropy encoding on the calculated differential data.

The encoded data obtained by the entropy encoding with the entropy encoder 9 is added to the back of encoded data corresponding to the already-obtained same image as data for updating the previously-obtained coarsest image.

Further, in order to encode information impaired by the quantization of the so-updated image data, the local inverse quantization controller 10 similarly performs quantization and entropy coding on data corresponding to the difference between the data next previously inputted to the quantizer 8 and data obtained by quantizing and inversely quantizing the input data, i.e., a quantization error signal, and repeatedly performs each time a process for adding the so-updated image data to the back of the already-reconstructed encoded data until the loss of information by quantization is eliminated, i.e., a quantization error reaches zero, or the quantization error signal, i.e., the differential data is encoded as it is without its quantization to discontinue repeat processing.

In the above-described processing block, the progressive coding controller 11 performs processes or control necessary for deciding a quantization step size in the quantizer 8 so as to make a transition from coarseness to fineness, determining whether the quantization error reaches zero, and carrying out image progressive coding such as the encoding of the differential data without its quantization.

In the image expanding device illustrated in the embodiment 2, as shown in FIG. 4, a progressive decoding processor 12 first fetches only encoded data necessary to decode the coarsest image data from the head of the progressive coded bit stream inputted thereto and transmits it to an entropy decoder 13. The entropy decoder 13 performs entropy decoding on the same data and sends it to an inverse quantizer 14. The inverse quantizer 14 inversely-quantizes the data received by the entropy decoder 13, using the quantization step size given as a header of the encoded data.

The first y-direction one-dimensional inverse lossless wavelet transformation part 31, the second y-direction one-dimensional inverse lossless wavelet transformation part 32 and the x-direction one-dimensional inverse lossless wavelet transformation part 33 perform necessary processing on the datan inversely-quantized by the inverse quantizer 14 to thereby obtain the coarsest reconstructed image to be represented on a display.

Upon generation of the coarsest image, the data obtained by the inverse quantization of the inverse quantizer 14 is transmitted to the transformation coefficient buffer 32b simultaneously with the inverse lossless wavelet transformer 32a and subjected to buffering for the next execution of image updating. When new transformation coefficient data is now subjected to buffering, the data already subjected to buffering is transmitted to the updated auxiliary information generator 32c and used to newly update the already displayed image data.

Such image updating process is performed in accordance with the control of a progressive coding controller 16 as follows.

The progressive coding controller 16 fetches decoded data necessary to further update the coarsest image or image displayed at the present time from the progressive coded bit stream and inputs it to the progressive decoding processor 12. Further, the entropy decoder 13 performs entropy decoding only on the encoded data necessary for updating, the inverse quantizer 14 performs inverse quantization on the so-processed data and the inverse lossless wavelet transformer 32a effects inverse lossless wavelet transformation on the input data and transmits the reconstructed data to the adder 35.

Simultaneously, the updated auxiliary information generator 32c generates updated auxiliary information necessary to progressively update and display each image from the datan inversely quantized by the inverse quantizer 14 and the data subjected to buffering by the transformation coefficient buffer 32b and sends the resultant auxiliary information to the adder 35. The adder 35 adds the image information generated by the inverse lossless wavelet transformer 32a and the updated auxiliary information generated by the updated auxiliary information generator 32c.

Thus, the data necessary to generate finer images out of the encoded data necessary to successively generate the coarse to finer images from the data necessary to generate the coarse images down are successively subjected to an expanding process. Each expanded data obtained in this way is added to the already displayed image data in the image domain, whereby progressive decoding/reconstruction of image coded data subjected to progressive coding, the updating of progressive image data and a progressive image representation are implemented.

In the lossless wavelet transformation unit 1, the x-direction one-dimensional lossless wavelet transformer 3 first performs one-dimensional lossless wavelet transformation on an image in an x direction thereof. Next, the first and second direction one-dimensional lossless wavelet transformers 4 and 5 repeat a process for performing one-dimensional lossless wavelet transformation in a y direction on the resultant converted image by a desired number of times in accordance with the instructions of the sub-band decomposition controller 6 with the same process as one unit, whereby the lossless wavelet transformation of the image is implemented so that lossless wavelet transformation coefficients are produced.

While the processing performed in the order of the x-direction one-dimensional dimensional lossless wavelet and the y-direction one-dimensional lossless wavelet is shown in FIG. 2 as one example, the processing of the order of the y-direction one-dimensional lossless wavelet and the x-direction one-dimensional lossless wavelet may be performed.

The inverse lossless wavelet transformation unit 15 performs one-dimensional inverse lossless wavelet transformation in the order opposite to that for the processing in the x and y directions at the lossless wavelet transformation unit 1 to thereby reconstruct an image from the lossless wavelet transformation coefficients. Namely, the inverse lossless wavelet translation unit 15 repeats a process for first performing one-dimensional inverse lossless wavelet transformation in a y direction of a band signal comprised of the lossless wavelet transformation coefficients with the first and second y-direction one-dimensional inverse lossless wavelet transformers 31 and 32 and next performing one-dimensional inverse lossless wavelet transformation in an x direction of the obtained result with the x-direction one-dimensional inverse lossless wavelet transformer 33 by the number of times defined as overhead of encoded data in accordance with the instructions of the sub-band decomposition controller 20 with the same process as one unit of the inverse lossless wavelet transforming process, whereby image data is reconstructed based on the lossless wavelet transformation coefficients.

According to the embodiment 2 as described above, the image progressive reconstruction display is realized by subjecting only the information necessary for updating to the inverse lossless wavelet transformation without performing the inverse lossless wavelet transformation on the information after the updating of the information in the lossless wavelet transformation coefficient domain, and adding the data obtained by the inverse transformation to the pre-updating image together with slight additional information in the image domain. Therefore, an effect is brought about in that it is unnecessary to hold all the transformation coefficient information used to generate the pre-updating image upon implementation of the progressive reconstruction display and the size of an execution memory can be reduced.

Further, the progressive reconstruction display is implemented by subjecting only information necessary for updating to the inverse lossless wavelet transformation without performing the lossless wavelet transformation on the information necessary for updating after the information is added to each transformation coefficient used to generate the pre-updating image in the transformation coefficient domain, and adding these in the image domain. As a result, an effect is brought about in that a sum-of-products operation in the inverse lossless wavelet transformation using the fact that the transformation coefficient information necessary for updating contains many zero coefficients, can be omitted so that a progressive reconstruction display process can be speeded up.

Embodiment 3

Figure 5:
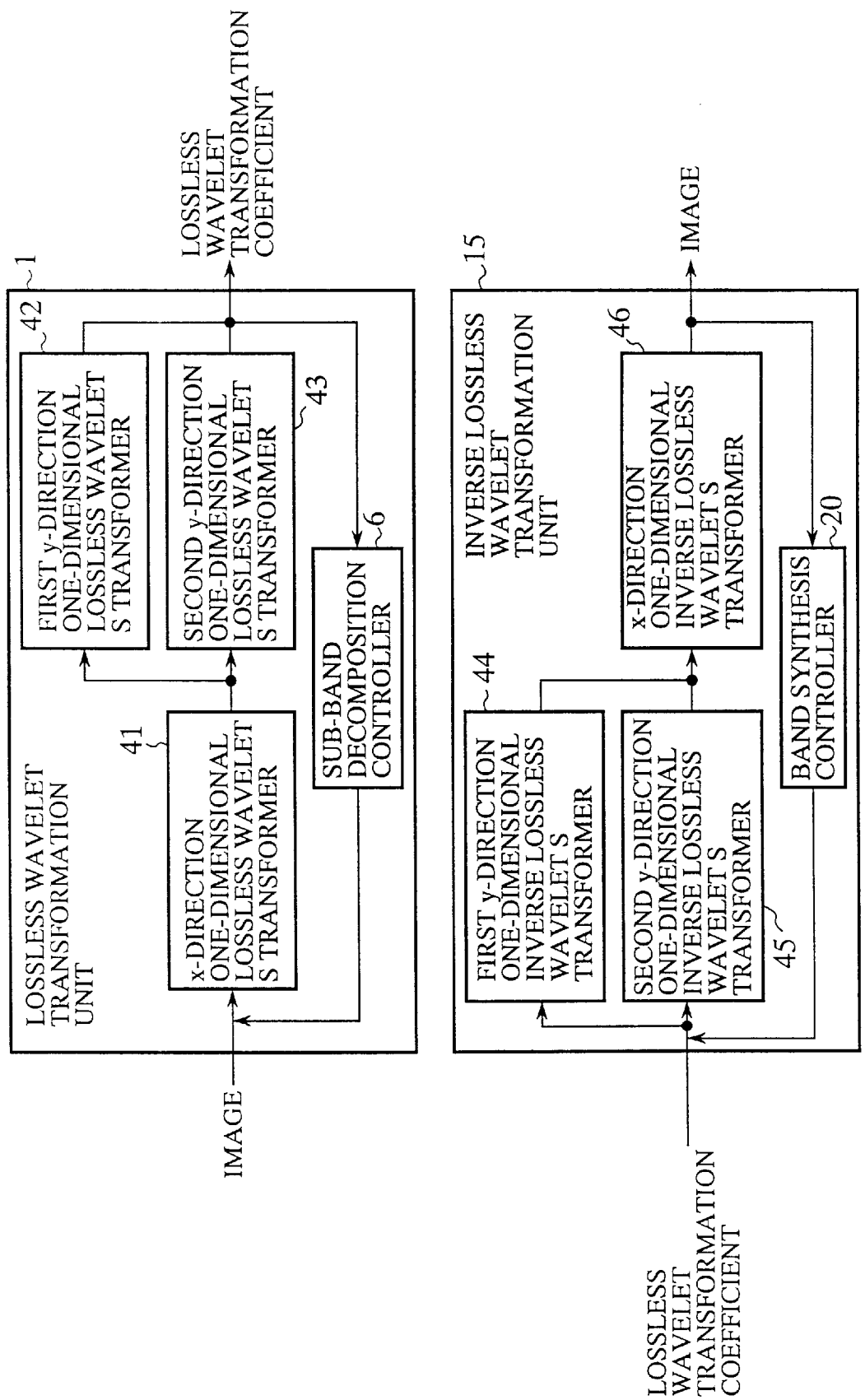
FIG. 5 is a block diagram illustrating configurations of a lossless wavelet transformation unit and an inverse lossless wavelet transformation unit of an image compressing/expanding device according to an embodiment 3 of the present invention.

FIG. 5 is a block diagram showing configurations of a lossless wavelet transformation unit 1 and a progressive inverse wavelet transformation unit 15 of an image compressing/expanding device according to an embodiment 3 of the present invention. The embodiment 3 is one wherein the x-direction one-dimensional lossless wavelet transformer 3 and the first and second y-direction one-dimensional lossless wavelet transformers 4 and 5 in the lossless wavelet transformation unit 1 shown in FIG. 4 are respectively defined as an x-direction one-dimensional S transformer 41 by which an x-direction one-dimensional S transformation corresponding to one of lossless wavelet transformations is performed, and first and second y-direction one-dimensional S transformers 42 and 43 by which a y-direction one-dimensional S transformation is carried out, and the first and second y-direction one-dimensional inverse lossless wavelet transformers 31 and 32 and the x-direction one-dimensional inverse lossless wavelet transformer 33 in the inverse lossless wavelet transformation unit 15 shown in FIG. 4 are respectively defined as y-direction one-dimensional inverse lossless wavelet S transformers 44 and 45 by which first and second y-direction one-dimensional inverse lossless wavelet S transformations each corresponding to the inverse of an S transformation are carried out, and an x-direction one-dimensional inverse lossless wavelet S transformer 46 by which an x-direction one-dimensional inverse lossless wavelet S transformation is carried out.

Figure 6:
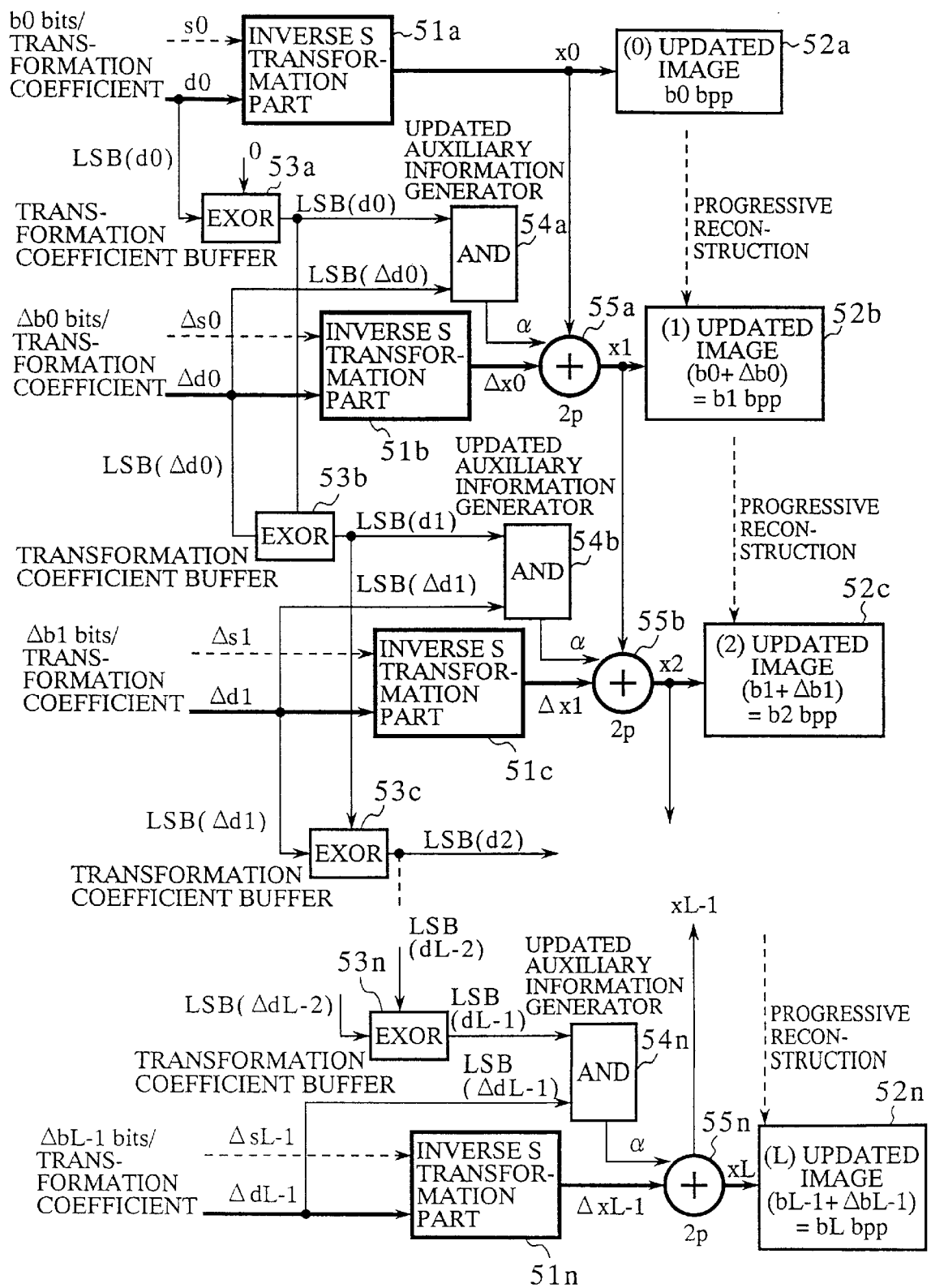
FIG. 6 is a block diagram showing a configuration of an S transformation part employed in the embodiment 3 of the present invention.

Since the first and second y-direction one-dimensional inverse lossless wavelet S transformers 44 and 45 and the x-direction one-dimensional inverse lossless wavelet S transformer 46 in the image expanding device according to the embodiment 3 are identical in internal configuration to one another, one example thereof will be shown in FIG. 6. It includes a plurality of inverse S transformation parts 51a through 51n, a plurality of updated images 52a through 52n, a plurality of transformation coefficient buffers (ExOR) 53a through 53n, a plurality of updated auxiliary information generators (AND) 54a through 54n, and a plurality of adders 55a through 55n.

The operation of one one-dimensional inverse lossless wavelet S transformer will next be explained with reference to FIG. 6.

In the image compressing device using the S transformation, transformation coefficient data (b0 bits/ transformation coefficient will be defined as a transformation coefficient s0 bearing a low-frequency component and a transformation coefficient d0 bearing a high-frequency component) obtained by performing entropy decoding and inverse quantization on encoded data necessary to first generate the coarsest image from progressive-coded image data is subjected to an inverse S transformation by the inverse S transformation part 51a from which a reconstructed image x0 is transmitted to a display as the coarsest reconstructed image b0 (bits/pel).

Now, information about LSB of the transformation coefficient d0 bearing the high-frequency component, of the transformation coefficients used to generate the image x0 is held in the transformation coefficient buffer 53a to generate data used to update the image x0 in the future. Incidentally, the contents held in the transformation coefficient buffer 53a is a value obtained by ExOR (Exclusive OR) of LSB of d0 and a value zero, i.e., the value of LSB of d0 itself.

Subsequent to this, transformation coefficient data (low-frequency component Δs0, high-frequency component Δd0, and Δb0 bits/transformation coefficient) obtained by performing entropy decoding and inverse quantization on encoded data necessary to update the image x0 by a desired bit rate Δb0 (bits/transformation coefficient) is inversely S-transformed by the inverse S transformation part 51b, so that image data x0 necessary for updating is generated. Simultaneously, updated auxiliary information α necessary to update the image x0 by Δd0 bits/pel is generated by making the logical product (the ANDing) of LSB of d0 and LSB of d0 held in the transformation coefficient buffer 53a by the updated auxiliary information generator 54a.

The image x0 and the updated auxiliary information α obtained in this way are added together by the progressive image reconstruction display part (adder) 55a, so that a reconstructed image x1 having information about b1=b0+Δd0 bit/pel is obtained. A value obtained by calculating XORing (ExOR) of LSB of the immediately preceding output value of the transformation coefficient buffer 53b and LSB of Δd0 is held in the transformation coefficient buffer 53b as data necessary to generate updated auxiliary information α (α: updated auxiliary information necessary to realize the updating of information in an image domain through the inverse S transformation) necessary to next update x1.

Thus, in the image expanding device according to the embodiment 3, the processing for updating the information in the image domain from the image data obtained by independently inversely S-transforming the encoded data necessary to update the image and the updated auxiliary information α obtained using some of the transformation coefficients used to generate the already-displayed image is repeatedly executed until the encoded data necessary for updating is brought to nothing, whereby the image is progressively reconstructed and displayed from the progressive encoded data by using the S transformation. Thus, the same image as an image prior to being encoded is finally played back and displayed.

According to the embodiment 3 as described above, the lossless wavelet transformation in the image compressing device is performed by the S transformation and the inverse lossless wavelet transformation in the image expanding device is carried out by the inverse S transformation, whereby the lossless wavelet transformation and inverse transformation can be implemented by a lower number of arithmetic operations and the amount of information about each transformation coefficient to be held to generate the updated auxiliary information a necessary to implement the progressive reconstruction and representation or display can be limited to one bit per each transformation coefficient. Namely, an effect is brought about in that an execution memory can be reduced.

Embodiment 4

Figure 7:
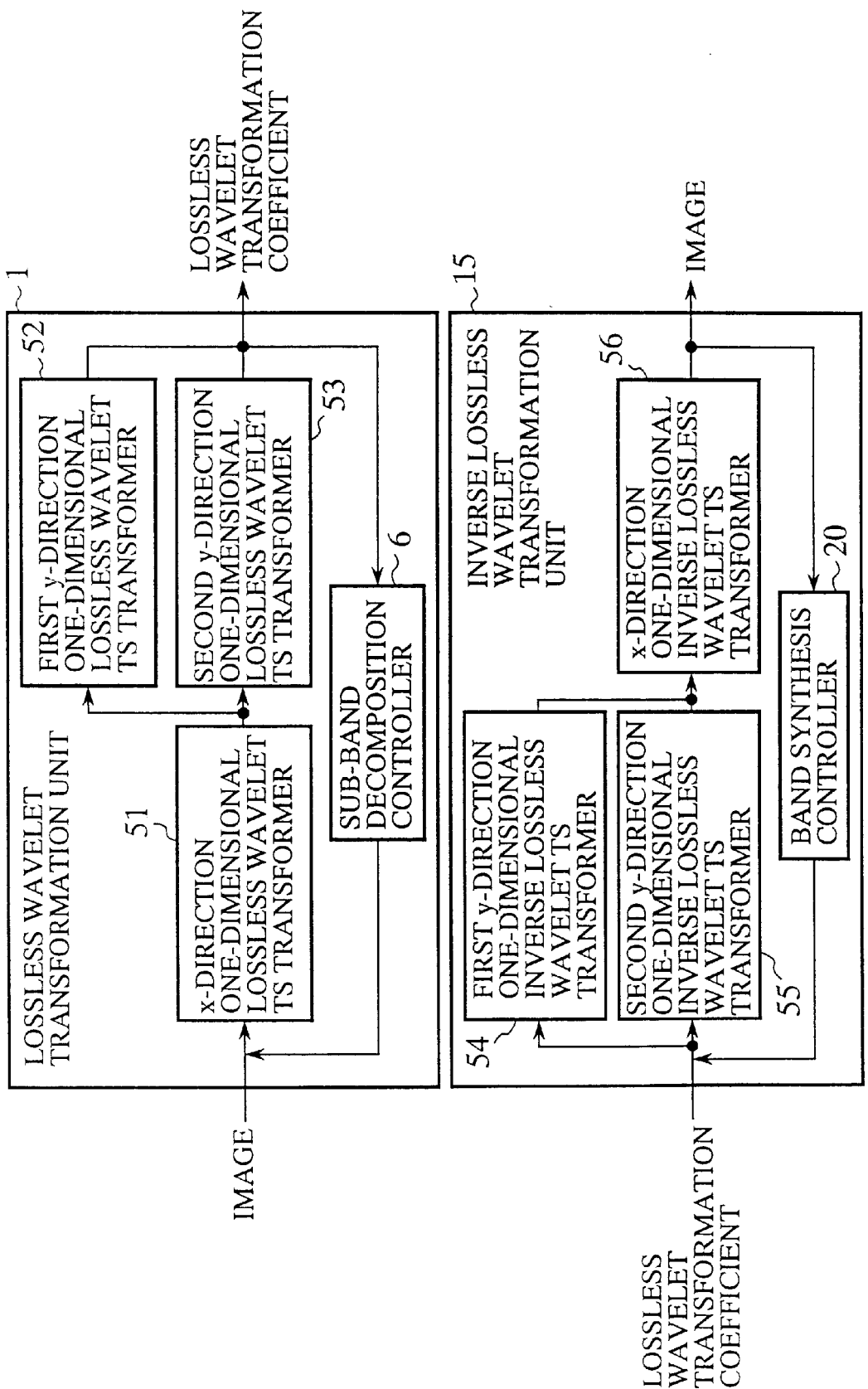
FIG. 7 is a block diagram illustrating a configuration of a lossless wavelet transformation unit and an inverse lossless wavelet transformation unit of an image compressing/expanding device according to an embodiment 4 of the present invention.

FIG. 7 is a block diagram showing configurations of a lossless wavelet transformation unit 1 and an inverse lossless wavelet transformation unit 15 in an image compressing/expanding device according to an embodiment 4 of the present invention. The present embodiment 3 is one wherein the x-direction one-dimensional lossless wavelet transformer 3 and the first and second y-direction one-dimensional lossless wavelet transformers 4 and 5 in the lossless wavelet transformation unit 1 shown in FIG. 2 are respectively defined as an x-direction one-dimensional TS transformer 51 which performs an x-direction one-dimensional TS transformation corresponding to one of lossless wavelet transformations, and first and second y-direction one-dimensional TS transformers 52 and 53 each of which performs a y-direction one-dimensional S transformation, and the first and second y-direction one-dimensional inverse lossless wavelet transformers 31 and 32 and the x-direction one-dimensional inverse lossless wavelet transformer 33 in the inverse lossless wavelet transformation unit 15 are respectively defined as y-direction one-dimensional inverse TS transformers 54 and 55 which respectively perform first and second y-direction one-dimensional inverse TS transformations each corresponding to the inverse of a TS transformation, and an x-direction one-dimensional inverse TS transformer 56 which performs an x-direction one-dimensional inverse TS transformation.

Figure 8:
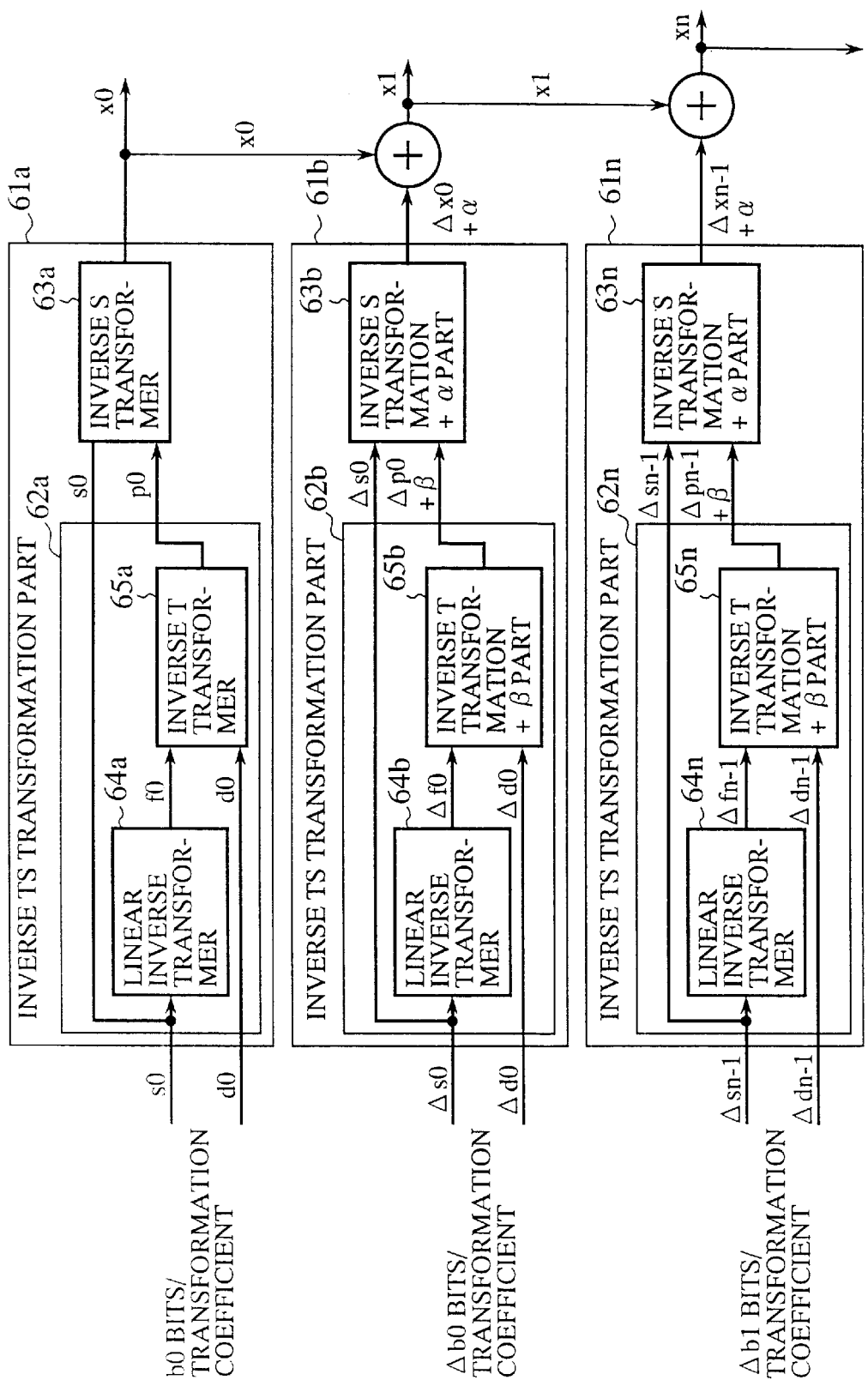
FIG. 8 is a block diagram depicting the details of a configuration of an inverse TS transformation part employed in the embodiment 4 of the present invention.
Figure 9:
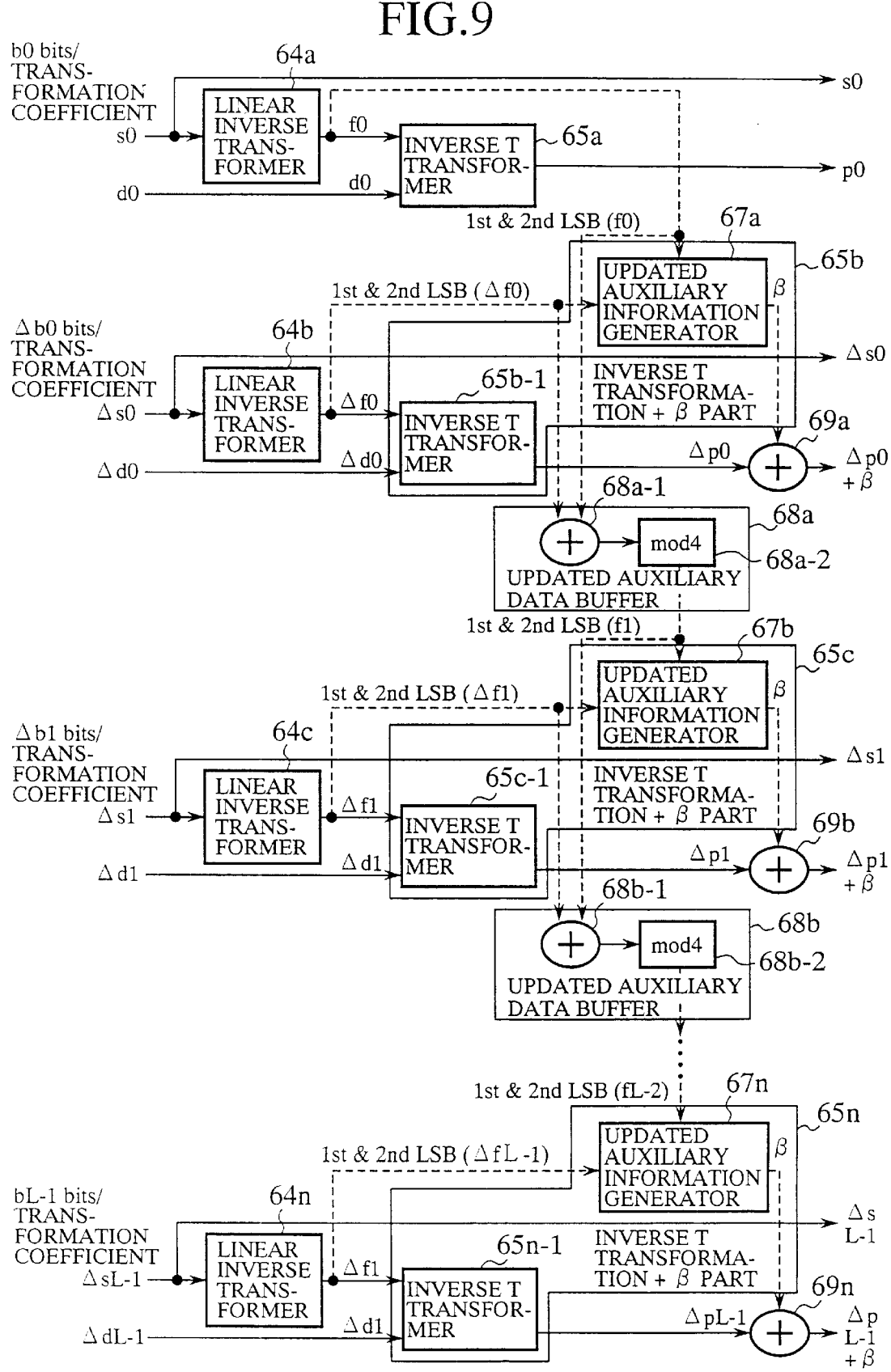
FIG. 9 is a block diagram showing a configuration of a transformation unit (hereinafter called "T transformer") constructed by a linear transformation and a nonlinear transformation placed in a stage prior to an S transformation employed in the embodiment 4 of the present invention.

The first and second y-direction one-dimensional inverse lossless wavelet TS transformers 54 and 55 and the x-direction one-dimensional inverse lossless wavelet TS transformer 56 in the image expanding device according to the embodiment 4 are identical in internal configuration to one another. As shown in FIGS. 8 and 9, there are provided a plurality of stages of inverse TS transformation parts 61a through 61n each comprised of a linear inverse transformer 64a, an inverse T transformer 65a and an inverse S transformer 63a.

As a result of this construction, a progressive reconstruction display of an image by the image expanding device according to the embodiment 4 can be realized by utilizing progressive reconstruction made through the linear inverse transformer 64a and the inverse T transformer 65a in combination with the previous stage of the progressive reconstruction display of the image through the inverse S transformation illustrated in the embodiment 3.

The operation will next be described.

If the amount of information necessary to reconstruct the coarsest image is represented as b0 bits/transformation coefficient, data used for image updating, additionally necessary to generate an image (x0, amount of information=b1 bits/transformation coefficient) for updating the same reconstructed image and improving the quality of the image by one stage is represented as Δx0 (amount of information=Δb0 bits/transformation coefficient, b1=b0+Δb0, x1=x0+Δx0), and data for updating, additionally necessary to generate an image (x1, amount of information=b2 bits/transformation coefficient) whose image quality is improved by another stage, is represented as x1 (amount of information=Δb1 bits/transformation coefficient, b2=b1+Δb1, x2=x1+Δx1), and similarly if updated data additionally necessary, at that time, to generate an image (xN, amount of information=bN bits/transformation coefficient) whose picture quality is improved by N stages in total, is represented as xN−1 (amount of information=bN−1 bits/transformation coefficient, bN=bN−1+ΔbN−1, xN=xN−1+ΔxN−1), then the progressive reconstruction display of the image by the image expanding device using the Inverse TS transformation, according to the embodiment 4 can be implemented as in a progressive reconstruction display made through the inverse TS transformation parts 61a through 61n shown in the drawing.

First, the coarsest image x0 is generated by subjecting a transformation coefficient s0 of a low-frequency component represented by the b0 bits/transformation coefficient to a linear inverse transformation with the linear inverse transformer 64a to thereby produce f0, next subjecting f0 and d0 (each corresponding to a transformation coefficient of a high-frequency component represented by b0 bits/transformation coefficient) to a T inverse transformation with the T inverse transformer 65a to thereby generate p0 and finally subjecting s0 and p0 to an inverse S transformation with the inverse S transformer 63a.

With respect to the image x1 obtained by updating the image x0 by one stage, information comprised of a Δb0 bits/transformation coefficient is additionally inputted to the progressive inverse TS transformation unit 15. Δf0 obtained through the linear inverse transformer 64b is generated from a transformation coefficient Δs0 of a low-frequency component represented by the Δb0 bits/transformation coefficient. Next, an inverse T transformation is effected on Δf0 and Δd0 (each corresponding to a transformation coefficient of a high-frequency component represented by the Δb0 bits/transformation coefficient). Thereafter, a process for performing an inverse T transformation and the generation of updated auxiliary information β necessary to update information in a post-inverse transformation domain through the inverse T transformation is effected on the result of the inverse T transformation with an inverse T transformation+βpart 65b comprised of an inverse T transformer 65b1 and an updated auxiliary information generator 65a for implementing image progressive reconstruction to thereby generate Δp0+β (Δp0: result of inverse T transformation and β: updated auxiliary information). Finally, data Δx0+α (Δx: result of inverse S transformation, and α: updated auxiliary information) obtained by performing an inverse S transformation on Δs0 and Δp0+β and thereafter subjecting the same to a process for performing an inverse S transformation and the generation of the updated auxiliary information α necessary to update information in a post-inverse transformation domain, i.e., an image domain through the inverse S transformation by an inverse S transformation+α part 63b used to implement image progressive reconstruction is added to x0 in the image domain, whereby the updating of x0, i.e., x1 is generated.

The image x2 obtained by updating x0 by another stage and the image xN obtained by updating xN-1 by an N-1 stage are similarly generated by adding information obtained by individually subjecting information necessary for updating to inverse TS transformations through a linear inverse transformer 64c, a T inverse transformer 65c-1 and an inverse S transformer 63c and information β obtained by an updated auxiliary information generator 67b, to an image to be updated in an image domain.

Incidentally, fk (wherein k=0, . . . N-1) indicates the result obtained by performing a linear inverse transformation on sk with the linear inverse transformer 64. Pk indicates the result obtained by effecting a T inverse transformation on fk and dk with an inverse T transformer 65k. ΔPk+β indicates updated information obtained by adding additional information necessary to update pk to Δpk and is obtained by effecting an inverse T transformation and an additional process for updating on Δfk and Δdk with an inverse T transformation+β part 65k. Δxk indicates the result obtained by effecting an inverse S transformation on Δsk and Δpk with an inverse S transformer 63k. Δxk and Δα indicates updated information obtained by adding additional information necessary to update xk to other than Δxk and is obtained by performing an inverse S transformation and an additional process for updating with an inverse S transformation+α part 63k with Δsk and ΔPk+β as an input.

The progressive reconstruction display of the image through the inverse TS transformations in the image expanding device illustrated in the embodiment 4 will be explained below by reference to a procedure for progressive reconstruction by the linear inverse transformer 64a and T inverse transformer 65a constructed together with the inverse S transformer 63a, i.e., a procedure by which updated auxiliary information necessary to realize a progressive reconstruction display process in an image domain through the inverse TS transformations is generated by an updated auxiliary information generator 67a.

The inverse T transformer 65k performs an inverse T transformation on Δfk and Δdk to generate Δpk. A p updater 69a adds the same Δpk to pk and further adds updated auxiliary information β generated by the updated auxiliary information generator 67a from the two rightmost bits of fk-1 and the two rightmost bits of fk to pk+Δpk, whereby the updating of p is realized so as to generate pk+1 (=pk+Δpk+β).

The two rightmost bits of fk-1 corresponding to one of information necessary to generate the updated auxiliary information are obtained if the two rightmost bits of f0 generated by a linear inverse transformation in the process of generating the coarsest image through the inverse TS transformations are held when k=0. The two rightmost bits of f1 corresponding to updated auxiliary information at the time of k=1 are obtained by adding the values of the two rightmost bits of Δf0 obtained by a linear inverse transformation of Δs0 to the values of the two rightmost bits of f0 held and holding the remainder obtained by dividing the result of addition by 4 in an updated auxiliary data buffer 68a.

Figures 1, 10:
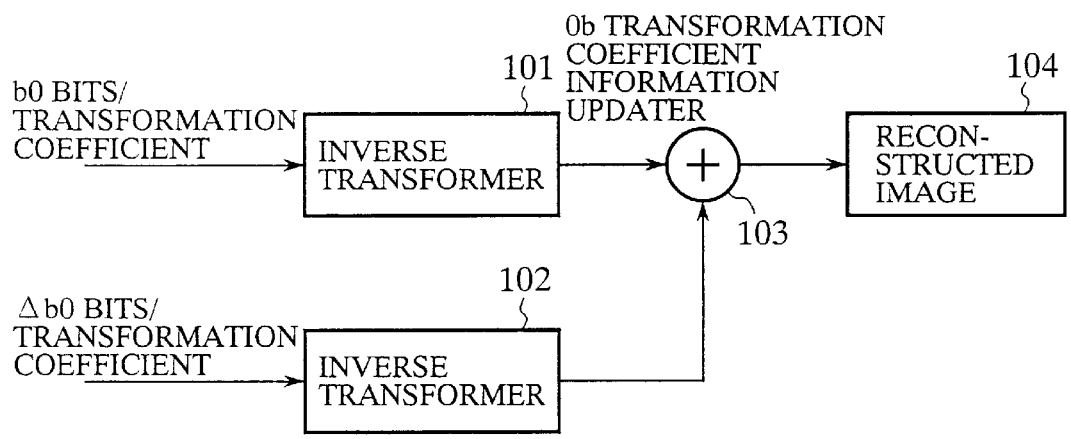
FIG. 1 is block diagram showing a configuration of a conventional image expanding device.
FIG. 10 is a diagram showing a table for generating updated auxiliary information.

Similarly, the two rightmost bits of fk are obtained by adding the two rightmost bits of Δfk-1 to the values of the two rightmost bits of fk-1 held and calculating the remainder obtained by dividing the result of addition by 4 in the updated auxiliary data buffer 68a. The generation of the updated auxiliary information by the updated auxiliary information generator 67a is performed in accordance with an updated auxiliary information e generation table (see FIG. 10, e.g., when the values of the two rightmost bits of Δfk are 2 and the values of the two rightmost bits of fk are 3, the value of the updated auxiliary information β becomes "-1").

According to the embodiment 4 as described above, the lossless wavelet transformation of the image compressing device is performed based on the TS transformations, whereas the inverse lossless wavelet transformation of the image expanding device is performed based on the inverse TS transformations, whereby an effect is brought about in that as compared with the use of the S transformation and Inverse S transformation, a higher picture-quality reconstructed image can be obtained when compared under the same bit rate.

Embodiment 5

In the image compressing/expanding device according to the embodiment 3, the S transformation and Inverse S transformation have always been used as the lossless wavelet transformation and the inverse lossless wavelet transformation, whereas in the image compressing/expanding device according to the embodiment 4, the TS transformations and the inverse TS transformations have always been used as them.

On the other hand, in the image compressing/expanding device illustrated in the embodiment 5, respective one-dimensional lossless wavelet transformations may be performed based on the S transformation or TS transformations in the compressing device. Even in the case of the expanding device, the corresponding inverse transformation may be merely carried out in the order opposite to that for the transformations done by the compressing device. Respective one-dimensional inverse lossless wavelet transformations may be performed based on an inverse S transformation or inverse TS transformations.

Figure 11:
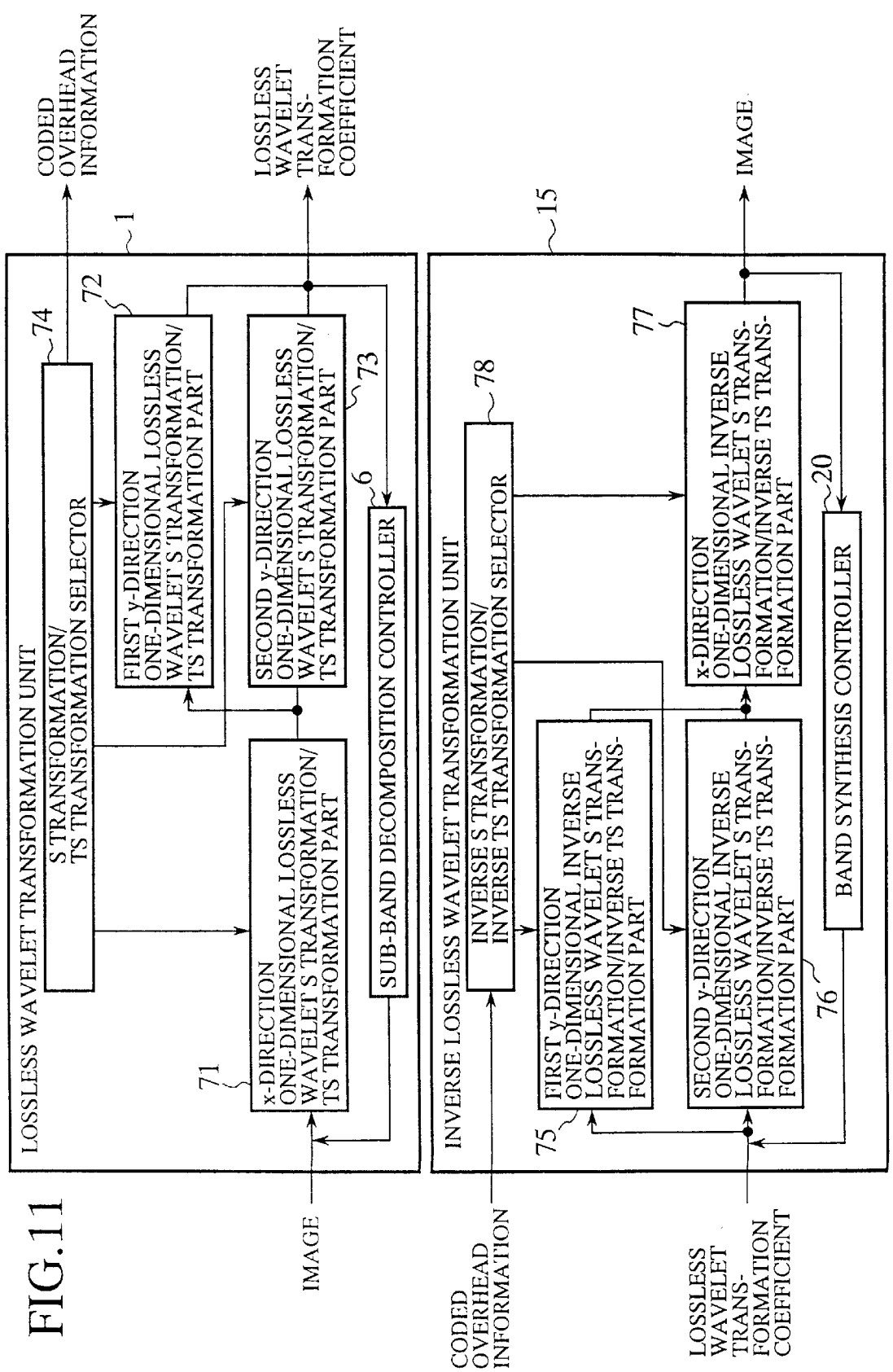
FIG. 11 is a block diagram illustrating configurations of a lossless wavelet transformation unit and an inverse lossless wavelet transformation unit of an image compressing/expanding device according to an embodiment 5 of the present invention.

Thus, the embodiment 5 is constructed as shown in FIG. 11. In a lossless wavelet transformation unit 1 of the image compressing device, an x-direction one-dimensional S transformation/TS transformation part 71 effects an S transformation or TS transformations selected by an S transformation/TS transformation selector 74 on an image received as an input in an x direction of the image. Subsequently, first and second y-direction one-dimensional S transformation/TS transformation parts 72 and 73 effect the S transformation or TS transformations selected by the S transformation/TS transformation selector 74 on a y-direction of the so-obtained result to thereby perform a lossless wavelet transformation.

At this time, the S transformation/TS transformation selector 74 holds therein whether the respective transformations in the respective directions are done by either of the S transformation and the TS transformations. Data about this held therein is transferred to the receiving side, i.e., the expanding device as coded overhead information together with encoded data.

The holding of selected information about the S transformation/TS transformations executed upon lossless wavelet transformations to be performed once per x and y directions, besides, upon respective transformations is repeatedly effected on the lowest frequency component next previously obtained by the lossless wavelet transformations to be performed once per x and y directions, by the predetermined number of times in accordance with the control of a sub-band decomposition controller 6, whereby a lossless wavelet transformation of a desired level is implemented.

In the image expanding device 15, an inverse S transformation/inverse TS transformation selector 78 selects, based on the order of the S transformation and TS transformations selected by the image compressing device 1, which are inputted as the overhead information about the encoded datan inverse transformations associated with it in its reverse order, i.e., an inverse S transformation or inverse TS transformations. Based on the selected information and in accordance with the control of a band synthesis controller 20, first and second y-direction one-dimensional inverse lossless S transformation/inverse TS transformation parts 75 and 76 first effect one-dimensional lossless wavelet transformations on y-directions of data subsequent to entropy decoding by the predetermined number of times or the number of times data is sent as the overhead information from the transmitting side. Subsequently, an x-direction one-dimensional inverse lossless S transformation/inverse TS transformation part 77 repeatedly performs a process for carrying out the one-dimensional lossless wavelet transformation on the obtained result in the x direction to thereby perform image expanding treatment.

According to the embodiment 5 as described above, the lossless wavelet transformation of the image compressing device is carried out by a combination of the S transformation and TS transformations, whereas the inverse lossless wavelet transformation of the image expanding device is performed by a combination of the inverse S transformation and inverse TS transformations. Thus, an effect is brought about in that as compared with the case where the progressive reconstruction display of the image is done by the S transformation and Inverse S transformation alone, higher image quality is obtained if compared at the same bit rate, and as compared with the case in which the progressive reconstruction display of the image is performed by the TS transformations and inverse TS transformations alone, less updated auxiliary information is provided, i.e., the capacity of an execution memory is reduced, whereby the progressive reconstruction display can be performed.

Embodiment 6

FIG. 12 is a block diagram showing a configuration of an image expanding device in an image compressing/expanding device according to an embodiment 6 of the present invention. The same parts as those employed in the embodiment 2 shown in FIG. 4 are identified by the same reference numerals and the description of certain common parts will therefore be omitted. In the drawing, reference numeral 81 indicates a first y-direction one-dimensional inverse lossless wavelet transformation part, reference numeral 82 indicates a second y-direction one-dimensional inverse lossless wavelet transformation part, reference numeral 83 indicates an x-direction one-dimensional inverse lossless wavelet transformation part, reference numerals 84 through 86 indicate adders, and reference numeral 87 indicates a zero counter, respectively.

The first and second y-direction one-dimensional inverse lossless wavelet transformation parts 81 and 82 are identical to one another in internal configuration. The configuration of the second y-direction one-dimensional inverse lossless wavelet transformation part 82 will be explained as one example thereof. The second y-direction one-dimensional inverse lossless wavelet transformation part 82 has an inverse lossless wavelet transformer 82a, a transformation coefficient buffer 82b, an updated auxiliary information generator 82, a zero coefficient determinator 82 and a zero coefficient arithmetic omitter 82e. Further, the x-direction one-dimensional inverse lossless wavelet transformation part 83 includes an inverse lossless wavelet transformer 83a, a transformation coefficient buffer 83b, an updated auxiliary information generator 83c, a zero coefficient determinator 83d and a zero coefficient arithmetic omitter 83e.

According to the embodiment 6, the omission of arithmetic operation of the inverse lossless wavelet transformation on each transformation coefficient zero in value is implemented to execute the image progressive reconstruction display at high speed. Namely, the zero coefficient determinator 82d makes a decision as to whether the value of each lossless wavelet transformation coefficient outputted from an inverse quantizer 14 is zero. If the value is found to be zero, then the zero coefficient determinator 82d sends instructions to the zero coefficient arithmetic omitter 82e where arithmetic control is performed so as to omit a sum-of-products arithmetic operation for an inverse lossless wavelet transformation effected on the same coefficient by the inverse lossless wavelet transformer 82a, whereby an effect that a progressive reconstruction display process can be speeded up, is brought about.

When the lossless wavelet transformation coefficient takes the value of zero continuously, the zero counter 87 detects that the zero value is a predetermined number. As a result, the zero coefficient arithmetic omitter 82e is directly controlled based on the output of the zero counter 87, so that arithmetic control can be carried out so as to omit a sum-of-products arithmetic operation, whereby an effect that a progressive reconstruction display process can be performed at higher speed, is brought about.

Embodiment 7

The image compressing/expanding devices according to the aforementioned respective embodiments are applied to a facsimile, a portable terminal, a display unit or a printer so as to perform an image decoding process, thereby making it possible to obtain an image high in picture quality.

Incidentally, the S transformation, inverse S transformation, TS transformation and inverse TS transformation in the aforementioned embodiments 3 through 5 are respectively represented by the following arithmetic expressions:

S transformation (forward transformation, transmitting side):

$$s(n) = \left\lfloor \frac{x(2n) + x(2n+1)}{2} \right\rfloor$$

$$d(n) = x(2n) - x(2n+1)$$

Inverse S transformation (inverse transformation, receiving side):

$$x(2n) = s(n) + \left\lfloor \frac{d(n)+1}{2} \right\rfloor$$

$$x(2n+1) = s(n) - \left\lfloor \frac{d(n)}{2} \right\rfloor$$

TS transformation (forward transformation, transmitting side):

$$s(n) = \left\lfloor \frac{x(2n)+x(2n+1)}{2} \right\rfloor$$

$$d(n) = x(2n+2) - x(2n+3) + \left\lfloor \frac{-s(n)+s(n+2)+2}{2} \right\rfloor$$

Inverse TS transformation (inverse transformation, receiving side):

$$x(2n) = s(n) + \left\lfloor \frac{p(n)+1}{2} \right\rfloor$$

$$x(2n+1) = s(n) - \left\lfloor \frac{p(n)}{2} \right\rfloor$$

$$p(n) = d(n-1) - \left\lfloor \frac{f(n)+2}{4} \right\rfloor$$

$$f(n) = -s(n-1) \div s(n+1)$$

where transformation for generating p(n) and the transformation for generating f(n) are respectively called an inverse T transformation and a linear inverse transformation for convenience's sake.

INDUSTRIAL APPLICABILITY

As has been described above, the image compressing/expanding device according to this invention is effective and suitable for application to image decoding for a facsimile, a portable information terminal, a display unit and a printer.

What is claimed is:

1. An image compressing/expanding method, comprising:
    on the image compression side, performing quantization and entropy coding on a lossless wavelet transformation coefficient subjected to a lossless wavelet transformation; and
    on the image expansion side, adding pre-inverse-transformation data, which includes a lossless wavelet transformation coefficient subjected to entropy decoding and inverse quantization, to the coefficient-domain update data subjected to entropy decoding and inverse quantization, and thereafter performing said inverse lossless wavelet transformation on the result of addition to thereby generate an image.

2. An image compressing/expanding method comprising:
    on the image compression side, performing quantization and entropy coding on each lossless wavelet transformation coefficient subjected a lossless wavelet transformation; and
    on the image expansion side, effecting an inverse lossless wavelet transformation on a lossless wavelet transformation coefficient subjected to entropy decoding and inverse quantization to thereby generate an image, and generating image-domain update information necessary upon updating an image by adding the image generated by the inverse lossless wavelet transformation to the already generated image, from information necessary upon updating the quality of the image by a next stage and some of information about each transformation coefficient immediately before the execution of said inverse lossless wavelet transformation.

3. An image compressing/expanding device, comprising:
    an image compressing device including,
    a lossless wavelet transformation unit for subjecting a digital image to a lossless wavelet transformation; and
    a progressive coding generation unit for subjecting lossless wavelet transformation coefficients obtained as a result of lossless wavelet transformation to quantization and entropy coding to thereby generate a coded bit stream added to an already generated coded bit stream and simultaneously generating a progressive coded bit stream while repeating this operation until the value of a quantization error reaches zero; and
    an image expanding device including,
    an inverse lossless wavelet transformation unit for effecting an inverse lossless wavelet transformation on each lossless wavelet transformation coefficient subjected to entropy decoding and inverse quantization with each of N types of data necessary to update data of said progressive coded bit stream by N stages as one processing unit, thereby generating an image;
    a transformation coefficient buffer for holding some of pre-inverse-transformation coefficient data generated upon the generation of the image; and
    a transformation coefficient information updater for adding image-domain update information generated from data obtained by subjecting transformation coefficient data obtained by effecting entropy decoding and inverse quantization on the next processing unit bearing information for updating said image to an inverse lossless wavelet transformation with said inverse lossless wavelet transformation unit, some of the same inversely-transformed data and the data held in said transformation coefficient buffer, to the immediately preceding reconstructed/displayed image in an image domain, thereby to update image information.

4. The image compressing/expanding device according to claim 3, which is applied to an image decoding process of a facsimile.

5. The image compressing/expanding device according to claim 3, which is applied to an image decoding process of a portable information terminal.

6. The image compressing/expanding device according to claim 3, which is applied to an image decoding process of a high image-quality display unit.

7. The image compressing/expanding device according to claim 3, which is applied to an image decoding process of a printer.

8. An image compressing/expanding device, comprising:
    an image compressing device including,
    a lossless wavelet transformation unit for subjecting a digital image to a lossless wavelet transformation; and
    a progressive coding generation unit for subjecting lossless wavelet transformation coefficients obtained as a result of lossless wavelet transformations to quantization and entropy coding to thereby generate a coded bit stream added to an already generated coded bit stream and simultaneously generating a progressive coded bit stream while repeating this operation until the value of a quantization error reaches zero; and an image expanding device including,
an inverse lossless wavelet transformation unit for effecting an inverse lossless wavelet transformation on each lossless wavelet transformation coefficient subjected to entropy decoding and inverse quantization with each of N types of data necessary to update data of the progressive coded bit stream by N stages as one processing unit, thereby generating an image;
a transformation coefficient buffer for holding information necessary upon updating the quality of the image by a further stage, of the lossless wavelet transformation coefficients; and
an image-domain update information generator for generating image-domain update information additionally necessary upon updating the image by adding the image generated by the inverse lossless wavelet transformation to the already-reconstructed image from the information stored in said transformation coefficient buffer and information about each transformation coefficient immediately before the execution of the inverse lossless wavelet transformation.

9. The image compressing/expanding device according to claim 8, comprising:
an image compressing device having at least one S transformation part for implementing a lossless wavelet transformation by an S transformation; and
an image expanding device having at least on Inverse S transformation part for implementing an inverse lossless wavelet transformation by an inverse S transformation, and wherein the image-domain update information is generated only from LSB of respective lossless wavelet S transformation coefficients necessary to generate a pre-updating image through a lossless wavelet inverse S transformation and LSB of lossless wavelet S transformation coefficients bearing only information necessary for updating.

10. The image compressing/expanding device according to claim 8, comprising:
an image compressing device having at least on TS transformation part for implementing a lossless wavelet transformation by a TS transformation, and
an image expanding device having at least one inverse TS transformation part for implementing an inverse lossless wavelet transformation by an inverse TS transformation, and wherein the generation of image-domain update information under a progressive reconstructing process through an inverse transformation set in a stage preceding an inverse S transformation is performed as a first stage based only on the two rightmost bits of respective transformation coefficients necessary to generate pre-updating data through the same inverse transformation and the two rightmost bits of respective transformation coefficients bearing only information newly necessary for updating, and as a second stage, the so-obtained update information is progressively reconstructed through the inverse S transformation as an input, whereby the progressive reconstruction display of an image at the image expanding device is performed in accordance with the two-stage processing through the inverse S transformation.

11. An image compressing/expanding device according to claim 8, wherein said image compressing device or said image expanding device is provided with an S transformation/TS transformation selector for repeatedly applying sub-band decomposition to the lowest frequency sub-band components generated by the lossless wavelet transformation every x and y directions so as to decompose into a desired number of sub-bands and selecting the corresponding lossless wavelet transformation so as to selectively use the S and TS transformations according to the respective directions and respective repetitions without always having to use a single transformation.

12. An image compressing/expanding device, comprising:
an image compressing device including,
a lossless wavelet transformation unit for subjecting a digital image to a lossless wavelet transformation; and
a progressive coding generation unit for subjecting lossless wavelet transformation coefficients obtained as a result of lossless wavelet transformations to quantization and entropy coding to thereby generate a coded bit stream added to an already generated coded bit stream and simultaneously generating a progressive coded bit stream while repeating this operation until the value of a quantization error reaches zero; and
an image expanding device including,
an inverse lossless wavelet transformation unit for effecting an inverse lossless wavelet transformation on each lossless wavelet transformation coefficient subjected to entropy decoding and inverse quantization with each of N stages of data necessary to update data of said progressive coded bit stream by N stages as one processing unit, thereby generating an image;
a transformation coefficient buffer for holding information necessary upon updating the quality of the image by a further stage, of the lossless wavelet transformation coefficients;
an image-domain update information generator for generating image-domain update information additionally necessary upon updating the image by adding the image generated by the inverse lossless wavelet transformation to the already-reconstructed image from the information stored in said transformation coefficient buffer and information about each transformation coefficient immediately before the execution of the inverse lossless wavelet transformation;
a zero coefficient determinator for determining, immediately before the execution of the inverse lossless wavelet transformation, whether the values of the respective transformation coefficients are zero; and
a zero coefficient arithmetic omitter for omitting a sum-of-products arithmetic operation for an inverse lossless wavelet transformation effected on the transformation coefficients whose values are zero.

13. The image compressing/expanding device according to claim 12, wherein said image expanding device is provided with a zero number counter for counting the number of continuously-generated values zero of the transformation coefficients and outputting a signal used to omit the sum-of-products arithmetic operation for the inverse lossless wavelet transformation when the number thereof reaches a predetermined counted value.

14. An image compressing device, comprising:
an image compressing device including,
a lossless wavelet transformation unit for subjecting a digital image to a lossless wavelet transformation; and
a progressive coding generation unit for subjecting lossless wavelet transformation coefficients obtained as a result of lossless wavelet transformation to quantization and entropy coding to thereby generate a coded bit stream added to an already generated coded bit stream and repeating this operation until the value of a quantization error reaches zero.

15. The image compressing device according to claim 14, wherein said lossless wavelet transformation unit includes:

at least one S transformation part for implementing a lossless wavelet transformation by an S transformation.

16. The image compressing device according to claim 14, wherein said lossless wavelet transformation unit includes:

at least on TS transformation part for implementing a lossless wavelet transformation by a TS transformation.

17. The image compressing device according to claim 14, wherein said lossless wavelet transformation unit includes:

an S transformation/TS transformation selector for repeatedly applying sub-band decomposition to the lowest frequency sub-band components generated by the lossless wavelet transformation every x and y directions so as to decompose into a desire number of sub-bands and selecting the corresponding lossless wavelet transformation so as to selectively use the S and TS transformations according to the respective directions and respective repetitions without always having to use a single transformation.

18. An image expanding device comprising:

an inverse lossless wavelet transformation unit for effecting an inverse lossless wavelet transformation on each lossless wavelet transformation coefficient subjected to entropy decoding and inverse quantization with each of N types of data necessary to update data of the progressive coded bit stream by N stages as one processing unit, thereby generating an image;

a transformation coefficient buffer for holding information necessary upon updating the quality of the image by a further stage, of the lossless wavelet transformation coefficients; and an image-domain update information generator for generating image-domain update information additionally necessary upon updating the image by adding the image generated by the inverse lossless wavelet transformation to the already-reconstructed image, from the information stored in said transformation coefficient buffer and information about each transformation coefficient immediately before the execution of the inverse lossless wavelet transformation.

19. The image expanding device of claim 18, wherein said inverse lossless wavelet transformation unit includes:

at least on Inverse S transformation part for implementing an inverse lossless wavelet transformation by an inverse S transformation, and wherein the image-domain update information is generated only from LSB of respective lossless wavelet S transformation coefficients necessary to generate a pre-updating image through a lossless wavelet inverse S transformation and LSB of lossless wavelet S transformation coefficients bearing only information necessary for updating.

20. The image expanding device of claim 18, wherein said inverse lossless wavelet transformation unit includes:

at least one inverse TS transformation part for implementing an inverse lossless wavelet transformation by an inverse TS transformation, and wherein the generation of image-domain update information under a progressive reconstructing process through an inverse transformation set in a stage preceding an inverse S transformation is performed as a first stage based only on the two rightmost bits of respective transformation coefficients necessary to generate pre-updating data through the same inverse transformation and the two rightmost bits of respective transformation coefficients bearing only information newly necessary for updating, and as a second stage, the so-obtained update information is progressively reconstructed through the inverse S transformation as an input, whereby the progressive reconstruction display of an image at the image expanding device is performed in accordance with the two-stage processing through the inverse S transformation.

21. An image compressing/expanding method comprising:

on the image compression side, performing quantization and coding on transformed image data to generate a coded bit stream that is added to a previously generated coded bit stream to generate a progressive coded bit stream and repeating this operation N times until the value of a quantization error reaches zero;

on the image expansion side, performing decoding, inverse quantization, and inverse transformation on data of the progressive coded bit stream necessary to update the progressive coded bit stream by N stages, thereby generating an image.

* * * * *